United States Patent
Hirata et al.

(10) Patent No.: US 7,809,792 B2
(45) Date of Patent: Oct. 5, 2010

(54) CONFERENCE INFORMATION PROCESSING APPARATUS, AND CONFERENCE INFORMATION PROCESSING METHOD AND STORAGE MEDIUM READABLE BY COMPUTER

(75) Inventors: Kazutaka Hirata, Kanagawa (JP); Jun Miyazaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1164 days.

(21) Appl. No.: 10/933,228

(22) Filed: Sep. 3, 2004

(65) Prior Publication Data

US 2005/0210105 A1 Sep. 22, 2005

(30) Foreign Application Priority Data

Mar. 22, 2004 (JP) ............................. 2004-083268

(51) Int. Cl.
*G06F 15/16* (2006.01)
*G06F 3/00* (2006.01)

(52) U.S. Cl. ...................................... 709/205; 715/716
(58) Field of Classification Search ................. 709/205; 370/256; 715/716
See application file for complete search history.

(56) References Cited

U.S. PATENT DOCUMENTS

| | | | |
|---|---|---|---|
| 6,188,831 B1 * | 2/2001 | Ichimura ...................... 386/69 |
| 6,522,333 B1 * | 2/2003 | Hatlelid et al. .............. 345/474 |
| 6,539,099 B1 * | 3/2003 | Kellner ........................ 382/103 |
| 6,570,555 B1 * | 5/2003 | Prevost et al. ............... 345/156 |
| 6,651,218 B1 * | 11/2003 | Adler et al. .................. 715/209 |
| 6,789,105 B2 * | 9/2004 | Ludwig et al. ............... 709/204 |
| 6,850,252 B1 * | 2/2005 | Hoffberg ..................... 715/716 |
| 6,894,714 B2 | 5/2005 | Gutta et al. |
| 6,909,708 B1 * | 6/2005 | Krishnaswamy et al. ..... 370/352 |
| 6,934,756 B2 * | 8/2005 | Maes ........................... 709/227 |
| 7,039,676 B1 * | 5/2006 | Day et al. .................... 709/204 |
| 7,231,135 B2 * | 6/2007 | Esenyan et al. ............... 386/95 |
| 7,293,240 B2 * | 11/2007 | Lapstun et al. .............. 715/753 |
| 7,299,405 B1 * | 11/2007 | Lee et al. ..................... 715/700 |
| 7,356,763 B2 * | 4/2008 | Lin et al. ..................... 715/205 |
| 7,596,755 B2 * | 9/2009 | Graham ....................... 715/723 |
| 2002/0106623 A1 * | 8/2002 | Moehrle ...................... 434/365 |
| 2003/0004966 A1 * | 1/2003 | Bolle et al. ............... 707/104.1 |
| 2003/0046689 A1 * | 3/2003 | Gaos ........................... 725/34 |

FOREIGN PATENT DOCUMENTS

| | | |
|---|---|---|
| CN | 1422494 A | 6/2003 |
| JP | 06276548 A | 9/1994 |
| JP | 7-219971 A | 8/1995 |
| JP | 9-9202 A | 1/1997 |
| JP | 11272679 A | 10/1999 |
| JP | 2000-125274 A | 4/2000 |
| JP | 2000324444 A | 11/2000 |
| JP | 2002109099 A | 4/2002 |

* cited by examiner

*Primary Examiner*—William C Vaughn, Jr.
*Assistant Examiner*—Muktesh G Gupta
(74) *Attorney, Agent, or Firm*—Sughrue Mion, PLLC

(57) ABSTRACT

A conference information processing apparatus includes an extracting unit that extracts partial conference audio and/or visual information from conference audio and/or visual information. The partial conference audio and/or visual information has one or more physical events of a conference participant. The apparatus also has a providing unit that provides an index for the partial conference audio and/or visual information in accordance with a functional action abstracted from the one or more physical events.

34 Claims, 35 Drawing Sheets

Fig.2

| 22a SCENE LAYER | PRESENTATION | | | | DISCUSSION | |
|---|---|---|---|---|---|---|
| 22b FUNCTIONAL ACTION LAYER | SPEAKING | SPEECH-TYPE PUBLIC INFORMATION SPACE USING | SPEAKING | SPEECH-TYPE PUBLIC INFORMATION SPACE USING | SPEAKING | SPEECH-TYPE PUBLIC INFORMATION SPACE USING |
| 22c MEDIA LAYER | | | | | | |

22 HIERARCHICALLY VISUALIZED DATA

Fig.5

```xml
<?xml version="1.0" encoding="UTF-8" standalone="yes"?>
<Mpeg7>
    <Description>
        <ContentCollection>
            <MultiMediaContent>
                <AudioVisual>
                    <MediaLocator>
                        <MediaUri>file:/video1.mpg</MediaUri>
                    </MediaLocator>
                    <MediaTime>
                        <MediaTimePoint>0.0</MediaTimePoint>
                    </MediaTime>
                </AudioVisual>
            </MultiMediaContent>
            <MultiMediaContent>
                <AudioVisual>
                    <MediaLocator>
                        <MediaUri>file:/video2.mpg</MediaUri>
                    </MediaLocator>
                    <MediaTime>
                        <MediaTimePoint>1.0</MediaTimePoint>
                    </MediaTime>
                </AudioVisual>
            </MultiMediaContent>
        </ContentCollection>
        <Session>
            <Actor>
                <Name>Alice</Name>
                <FunctionalActCollection>
                    <FunctionalAct type="Question" id="0">
                        <MediaTime>
                            <MediaTimePoint>0</MediaTimePoint>
                            <MediaDuration>1</MediaDuration>
                        </MediaTime>
                        <RoleOfActor>Initiator</RoleOfActor>
                        <ActDirectionIntention>Betty</ActDirectionIntention>
                    </FunctionalAct>
                    <FunctionalAct type="Observing" id="1">
                        <MediaTime>
                            <MediaTimePoint>1</MediaTimePoint>
                            <MediaDuration>2</MediaDuration>
                        </MediaTime>
                        <RoleOfActor>Observer</RoleOfActor>
                        <ActDirectionIntention>Betty</ActDirectionIntention>
                    </FunctionalAct>
                </FunctionalActCollection>
            </Actor>
```

Fig.6

```
<Actor>
    <Name>Betty</Name>
    <FunctionalActCollection>
        <FunctionalAct type="Observing" id="0">
            <MediaTime>
                <MediaTimePoint>0</MediaTimePoint>
                <MediaDuration>1</MediaDuration>
            </MediaTime>
            <RoleOfActor>Observer</RoleOfActor>
            <ActDirectionIntention>Alice</ActDirectionIntention>
        </FunctionalAct>
        <FunctionalAct type="Statement" id="1">
            <MediaTime>
                <MediaTimePoint>1</MediaTimePoint>
                <MediaDuration>2</MediaDuration>
            </MediaTime>
            <RoleOfActor>Replier</RoleOfActor>
            <ActDirectionIntention>Alice</ActDirectionIntention>
        </FunctionalAct>
    </FunctionalActCollection>
</Actor>
<ConceptualSceneCollection>
    <ConceptualScene>
        <TextAnnotation>
            <FreeTextAnnotation>discussion</FreeTextAnnotation>
        </TextAnnotation>
        <MediaTime>
            <MediaTimePoint>0</MediaTimePoint>
            <MediaDuration>60</MediaDuration>
        </MediaTime>
    </ConceptualScene>
</ConceptualSceneCollection>
        </Session>
    </Description>
</Mpeg7>
```

Fig.8 FLOWCHART OF SUMMARIZING RULE GENERATING STEP

Fig.18
Fig. 18a — OBSERVING VIDEO SOURCE DATA
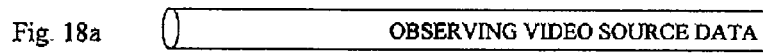
Fig. 18b — PARTICIPANT'S EYE MOVEMENT IMAGE DATA
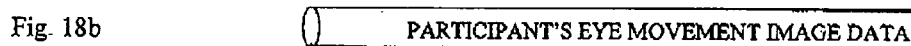
Fig. 18c — DETECTED OBSERVING TIME DURATION (PERIOD OF TIME)
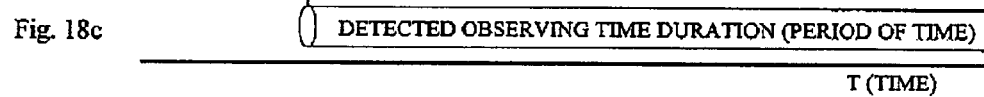
T (TIME)

Fig.28
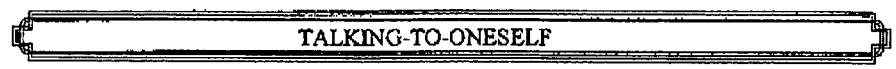
Fig. 28a
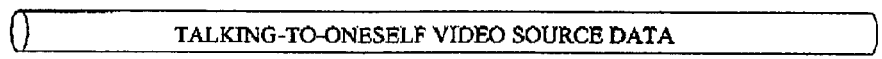
Fig. 28b
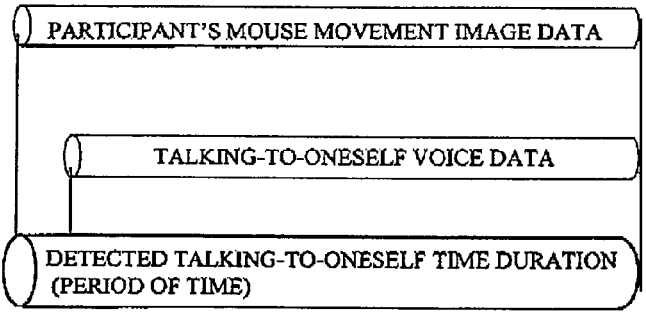
Fig. 28c
Fig. 28d
T (TIME)

CONFERENCE INFORMATION PROCESSING APPARATUS, AND CONFERENCE INFORMATION PROCESSING METHOD AND STORAGE MEDIUM READABLE BY COMPUTER

BACKGROUND OF THE INVENTION

1. Field of the Invention

The present invention relates to a conference information processing apparatus, a conference information processing method, and a storage medium readable by a computer.

2. Description of the Related Art

There have been conventional techniques relating to conference recording, such as techniques for indexing conference videos for future use, techniques for analyzing conference video images, techniques for summarizing conference videos, and techniques for summarizing conference videos in accordance with predetermined patterns and rules.

The conventional techniques are performed only on a physical event level. In a case where image data captured during a conference are to be processed by any of the above conventional techniques, however, suitable indexing cannot be performed for each action of the conference participants, and useful conference videos cannot be provided for those who view the conference video after the conference.

Furthermore, the conventional techniques do not even disclose specific significant actions. This method cannot provide different conference video summaries in accordance with different purposes of use, either.

SUMMARY OF THE INVENTION

The present invention has been made in view of the above circumstances and provide a conference information processing apparatus, and a conference information processing method and a storage medium readable by a computer in which the above disadvantages are eliminated.

According to an aspect of the present invention, there is provided a conference information processing apparatus has an extracting unit that extracts partial conference audio and/or visual information from conference audio and/or visual information. The partial conference audio and/or visual information also has one or more physical events of a conference participant. In addition, the apparatus has a providing unit that provides an index for the partial conference audio and/or visual information in accordance with a functional action abstracted from the one or more physical events.

According to another aspect of the present invention, there is provided a conference information processing method. The method has extracting partial conference audio and/or visual information from conference audio and/or visual information and providing an index for the partial conference audio and/or visual information in accordance with a functional action abstracted from one or more physical events of a conference participant of a conference participant.

According to another aspect of the present invention, there is provided a storage medium readable by a computer, the storage medium storing a program of instructions executable by the computer to perform a function has to extract partial conference audio and/or visual information from conference audio and/or visual information, and the conference audio and/or visual information containing one or more physical events of a conference participant, and to provide an index for the partial conference audio and/or visual information in accordance with a functional action abstracted from the one or more physical events.

BRIEF DESCRIPTION OF THE DRAWINGS

Embodiments of the present invention will be described in detail based on the following figures, wherein:

FIG. 2 shows visualized data that represent actions of conference participants in a hierarchical fashion;

FIG. 5 is the first half of a set of index data presented in the form of XML data;

FIG. 6 is the second half of a set of index data presented in the form of XML data;

FIG. 18 is a time line chart of a functional action of "Observing";

FIG. 28 is a time line chart of a functional action of "Talking-to-Oneself";

DESCRIPTION OF THE PREFERRED EMBODIMENTS

Hereinafter, exemplary embodiments of the present invention will be described in detail with reference to the drawings.

First Embodiment

Figure 1:
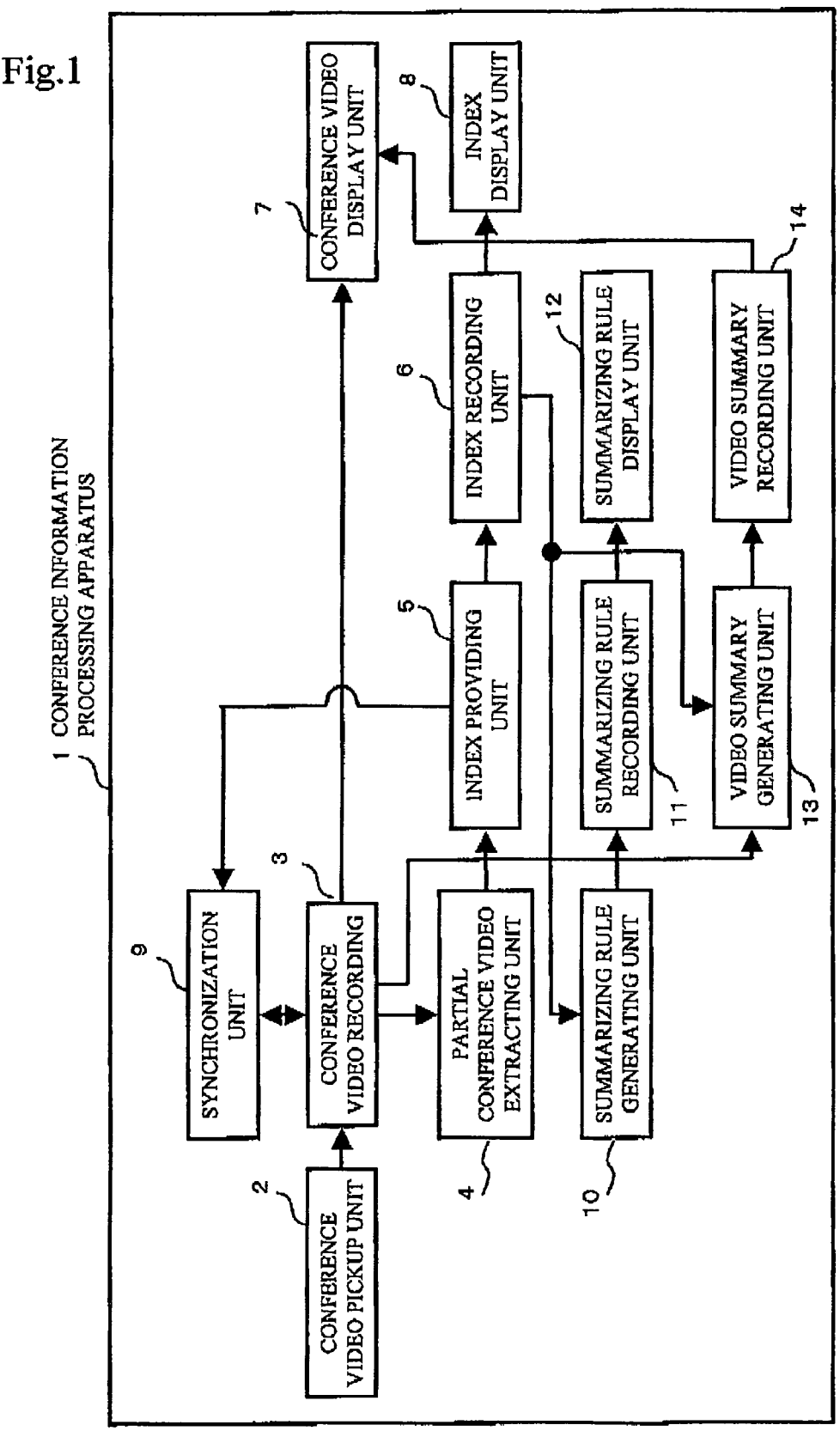
FIG. 1 is a block diagram illustrating a conference information processing apparatus in accordance with the present invention.

Referring first to FIG. 1, a conference information processing apparatus in accordance with a first embodiment of the present invention will be described. FIG. 1 is a block diagram illustrating an example of the conference information processing apparatus in accordance with this embodiment. The conference information processing apparatus 1 shown in FIG. 1 includes a conference video pickup unit 2, a conference video recording unit 3, a partial conference video extracting unit 4, an index providing unit 5, an index recording unit 6, a conference video display unit 7, an index display unit 8, a synchronization unit 9, a summarizing rule generating unit 10, a summarizing rule recording unit 11, a summarizing rule display unit 12, an video summary generating unit 13, and an video summary recording unit 14.

The conference video pickup unit 2, the conference video recording unit 3, the partial conference video extracting unit 4, the index providing unit 5, the index recording unit 6, the conference video display unit 7, the index display unit 8, the synchronization unit 9, the summarizing rule generating unit 10, the summarizing rule recording unit 11, the summarizing rule display unit 12, the video summary generating unit 13, and the video summary recording unit 14 are connected to one another via a network or data lines, control lines and circuits in the conference information processing apparatus 1.

The conference information processing apparatus 1 processes conference videos, and includes a CPU (Central Processing Unit), a ROM (Read Only Memory), and a RAM (Random Access Memory). The CPU loads a predetermined program into the RAM so as to partially carry out the functions shown in FIG. 1. The conference information processing method claimed by the present invention is realized in accordance with this program. The conference video pickup unit 2 is formed by a video camera and a microphone system (a sound collecting system, a sound pickup system, or a voice recording system), or a combination of the two, or the like. The conference video pickup unit 2 captures motion picture data and audio data, or conference video data that are a combination of the motion picture data and the audio data, and outputs the data to the conference video recording unit 3.

The conference video recording unit 3 is formed by a recording medium, such as a memory or a hard disc, and a recording device, or the like. The conference video recording unit 3 receives the conference video data captured by the conference video pickup unit 2, and records the conference video data on the recording medium such as built-in a memory or a hard disc. The conference video recording unit 3 then outputs the recorded conference video data to the partial conference video extracting unit 4, the video summary generating unit 13, and the conference video display unit 7. That is, the partial conference video extracting unit 4 extracts part or all of video data formed by motion picture data and audio data. More particularly, the partial conference video extracting unit 4 can extract only motion picture data from video data (recorded on the conference video recording unit 3), only audio data therefrom or part or all of motion picture data and audio data.

The partial conference video extracting unit 4 extracts partial conference audio and/or visual information from the conference audio and/or visual information stored in the conference video recording unit 3. The partial conference audio and/or visual information contains one or more physical events of a participant of a conference. The partial conference video extracting unit 4 further extracts the audio and/or visual information of each physical event from the partial conference video information. When extracting the partial audio and/or visual information, the partial conference video extracting unit 4 may extract part of the conference audio and/or visual information recorded on the conference video recording unit 3, or extract all of the conference audio and/or visual information recorded on the conference video recording unit 3. The partial audio and/or visual information extracted by the partial conference video extracting unit 4 is also referred to as partial conference video data or partial image data. The partial conference video extracting unit 4 includes an audio and/or visual processing device such as an image recognition device, a video audio and/or visual processing device such as a motion image data processing device or an audio and/or visual data processing device, and a speech processing device such as a voice recognition device, or the like.

The index providing unit 5 is formed by a CPU or the like. The index providing unit 5 provides suitable index data for the audio and/or visual information of each physical event extracted by the partial conference video extracting unit 4. The index providing unit 5 also identifies one or more functional actions abstracted from each corresponding physical event in the index data, and, in accordance with the functional actions, provides an index for the partial conference video data extracted by the partial conference video extracting unit 4. The index providing unit 5 performs a semi-automatic or full-automatic index data generating operation. In the first embodiment, a semi-automatic index data generating operation is performed. In a second embodiment described later, a full-automatic index data generating operation is performed.

The index providing unit 5 includes a pointer such as a mouse, a keyboard, and a graphical user interface such as a display. A user can manually generate index data, using the pointer, the keyboard, and the graphical user interface.

The index recording unit 6 is formed with a recording medium, such as a memory or a hard disc, and a recording device. The index recording unit 6 records the index data inputted from the index providing unit 5, and outputs the index data to the index display unit 8 or the video summary generating unit 13. The conference video display unit 7 is formed with a display device such as a display or a monitor. The conference video display unit 7 displays conference videos outputted from the conference video recording unit 3, partial images outputted from the partial conference video extracting unit 4, and conference videos summarized by the video summary generating unit 13. The index display unit 8 is formed with a display device such as a display or a monitor, and shows users the index data inputted through the index recording unit 6.

When there are two or more conference videos captured by the conference video pickup unit 2 in the same period of time, the synchronization unit 9 synchronizes the data of the captured conference videos with each other. By doing so, two or more conference videos can be synchronized with each other. The synchronization unit 9 uses delay time data as the parameter for the synchronization. The delay time data are recorded as the attribute information as to each set of image data on the conference video recording unit 3.

The summarizing rule generating unit 10 generates summarizing rule data that are to be used for summarizing the image data recorded on the conference video recording unit 3. The summarizing rule generating unit 10 outputs the summarizing rule data to the summarizing rule recording unit 11. The summarizing rule recording unit 11 is formed with a recording medium, such as a memory or a hard disc, and a recording device. The summarizing rule recording unit 11 records the summarizing rule data, which have been inputted from the summarizing rule generating unit 10, on the recording medium such as a built-in memory or a hard disc, and then outputs the summarizing rule data to the summarizing rule display unit 12. The summarizing rule display unit 12 is formed with a display device such as a display or a monitor, and shows users the summarizing rule data inputted from the summarizing rule recording unit 11.

The video summary generating unit 13 generates a conference video that is a summary of the conference audio and/or visual information of the conference video recording unit 3, based on the summarizing rule data inputted from the summarizing rule recording unit 11 and the index result provided by the index providing unit 5. The video summary generating unit 13 outputs the summarized conference video to the video summary recording unit 14. The video summary recording unit 14 is formed with a recording medium, such as a memory or a hard disc, and a recording device. The video summary recording unit 14 records the conference video summarized by the video summary generating unit 13. The video summary recording unit 14 outputs the recorded video summary data to the conference video display unit 7. Thus, the conference video produced in accordance with a functional action is displayed on the conference video display unit 7.

The partial conference video extracting unit 4, the index providing unit 5, the video summary generating unit 13, the video summary recording unit 14, the conference video display unit 7, and the synchronization unit 9, are equivalent to the extracting unit, the providing unit, the producing unit, the recording unit, the display unit, and the synchronization unit, respectively, in the claims of the present invention.

Referring now to FIG. 2, actions of the conference participants will be described. FIG. 2 shows hierarchically visualized data 22 that represent the actions of the conference participants in a hierarchical fashion. The visualized data 22 are presented to users by a graphical user interface (described later) via the index display unit 8. As shown in FIG. 2, the actions of the conference participants are classified into a scene layer 22a, a functional action layer 22b, and a media layer 22c. The scene layer 22a is a level higher than the functional action layer 22b. For example, "discussion" and "presentation" are classified as actions of the scene layer 22a.

The functional action layer 22b represents functional actions in functional action units, and is a level lower than the scene layer 22a but higher than the media layer 22c. For example, "Speaking" and "Speech-Type Public Information Space Using" are regarded as functional actions, though the details of the functional action layer 22b will be described later. The media layer 22c is a level lower than the functional action layer 22b, and represents data in data input/output units in accordance with a voice recognition technique or a gesture recognition technique. Physical actions (events) such as talking, looking at something, and making a gesture, are classified as events of the media layer 22c. Here, a functional action can be defined as an abstract of one or more physical events.

In this manner, the graphical user interface hierarchically displays physical events and functional actions that are abstracted from the physical events. The graphical user interface also displays scenes that are abstracted from one or more functional actions in a hierarchical fashion. Through the graphical user interface, the difference between the physical events and the functional actions abstracted from the physical events can be clearly recognized in the hierarchical layout, and the difference between the functional actions and the scenes abstracted from the functional scenes can also be clearly recognized in the hierarchical layout.

As shown in FIG. 2, each conference video is represented by multi-hierarchical data in which at least one hierarchical layer shows the descriptions of functional actions, and at least another one hierarchical layer shows the descriptions of scenes. Each conference video may be represented by data with one or more single-layer hierarchical representations or a multi-layer hierarchical representation.

The conference information processing apparatus 1 hierarchically visualizes each action of the conference participants. Also, the conference information processing apparatus 1 can process, store, accumulate, and externally display the data in a hierarchical fashion such as XML data or the like.

Examples of functional actions of the conference participants includes: Speaking; Attention Seeking; Speech Continuing; Observing; Participating; Non-Participating; Back-channeling; Questioning; Confirmatory Questioning; Speech-Type Thinking; Question-Type Thinking; Confirmatory Question-Type Thinking; Non-Speech-Type Thinking; Talking-to-Oneself: Question-Type Public Information Space Using; Confirmatory Question-Type Public Information Space Using; Non-Speech-Type Public Information Space Using; Participation-Type Private Information Space Using; Non-Participation-Type Private Information Space Using; Laughing; and Non-Decipherable Action.

The above actions are merely examples of functional actions that are abstracted from one or more physical events, and other functional actions may be included. Those functional actions will be defined at the end of the description of this embodiment.

Figure 3:
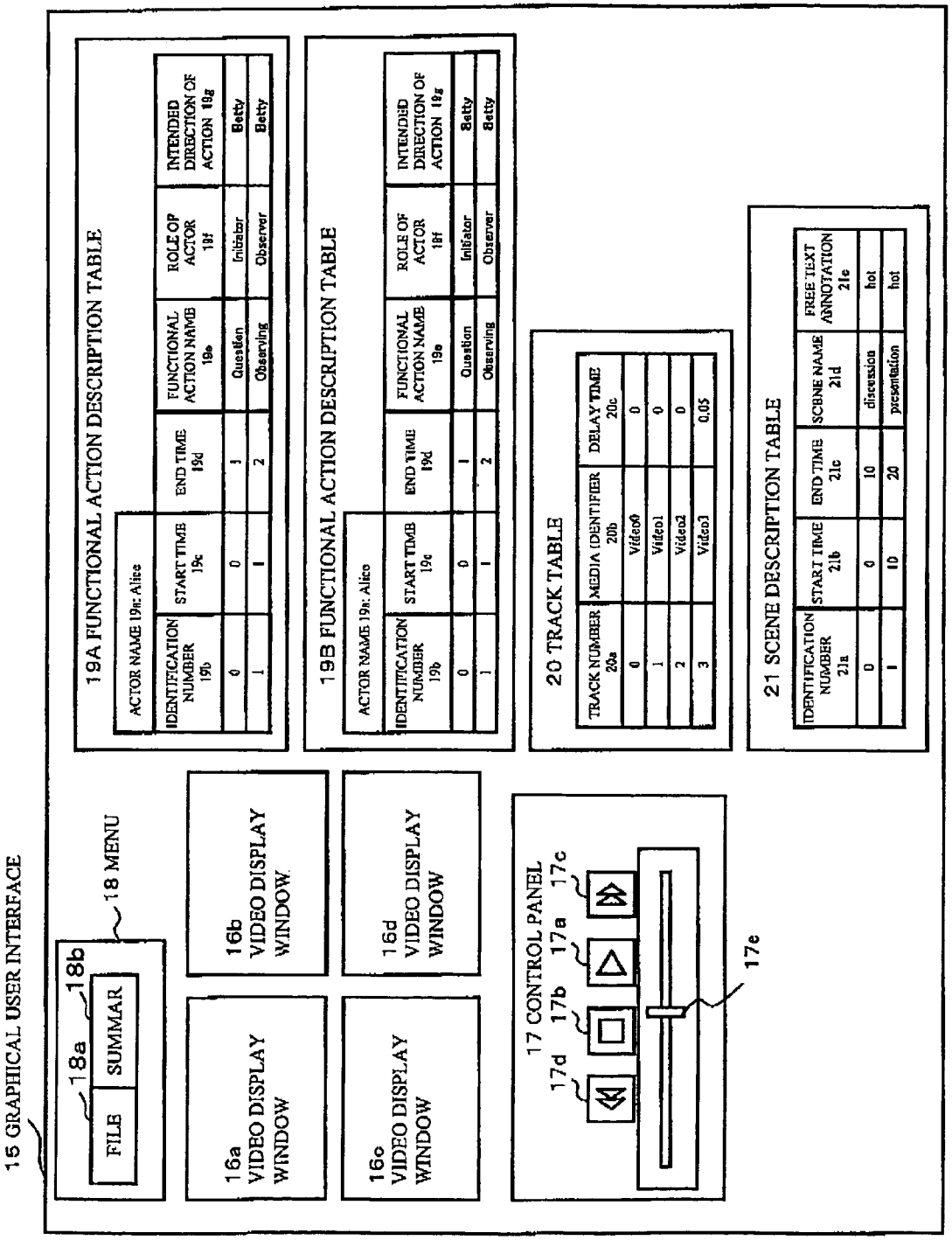
FIG. 3 is an example display of the graphical user interface provided by the index providing unit shown in FIG. 1.

The graphical user interface 15 provided by the index providing unit 5 will now be described in detail. FIG. 3 shows an example of a display of the graphical user interface 15 provided by the index providing unit 5. The display of the graphical user interface 15 is controlled by the USER of the operating system (OS), for example.

The index providing unit 5 displays the graphical user interface 15 on the index display unit 8 via the index recording unit 6 The graphical user interface 15 shows the index result of the index providing unit 5 on the conference video display unit 7. Using this graphical user interface 15, a user can control the entire conference information processing apparatus 1. Also, an index can be provided in accordance with functional actions.

As shown in FIG. 3, the graphical user interface 15 includes video display windows 16a through 16d, a control panel 17, a menu 18, functional action description tables 19A and 19B, a track table 20, and a scene description table 21. The video display windows 16a through 16d show conference videos recorded on the conference video recording unit 3 and partial conference videos extracted by the partial conference video extracting unit 4. The graphical user interface 15 displays the motion image data of a conference captured by video cameras of four systems and a stereo microphone of one system. Here, the motion image data supplied from the four video cameras are displayed on the video display windows 16a, 16b, 16c, and 16d, respectively.

The control panel 17 includes an image data replay button 17a, an image data stop button 17b, an image data fast-forward button 17c, an image data rewind button 17d, and a slider bar 17e. The control panel 17 is controlled by a user so as to control the motion image data that are replayed on the video display windows 16a through 16d, and audio data that are replayed through a speaker (the motion image data and the audio data might be collectively referred to as "image data").

The slider bar 17e is handled by a user so as to display synchronized motion image data on the video display windows 16a through 16d at any desired time. The menu 18 includes a file menu 18a and a summary menu 18b. The file menu 18a includes menu items such as "new motion image data read", "existing data read", "rewrite", "rename and save", and "end".

The summary menu 18b includes menu items such as "conference videos for reviewing", "conference videos for public viewing", and "conference videos for executives". By selecting these items, conference videos for reviewing, conference videos for public viewing, and conference videos for executives, can be generated from original conference videos. The conference videos for reviewing are useful for conference participants to review the video images of the conference they attended. The conference videos for public viewing are useful for those who did not attend the conference but are allowed to view the video images of the conference. The conference videos for executives are useful for company executives to view the video images of the conference.

The functional action description tables 19A and 19B are provided in accordance with the number of conference participants. The functional action description table 19A includes an "actor name" display column 19a, an "identification number" column 19b, a "start time" column 19c, an "end time" column 19d, a "functional action name" column 19e, a "role of actor" column 19f, and an "intended direction of action" column 19g. The functional action description table 19B is generated and displayed in accordance with each individual conference participant. In FIG. 3, for example, there are two conference participants "Alice" and "Betty". Therefore, the two tables, which are the functional action description table for "Alice" and the functional action description table for "Betty", are shown in FIG. 3.

The "identification number" column 19b indicates the sequential number for identifying each functional action. The "start time" column 19c and the "end time" column 19d indicate the start time and the end time of each functional action. The "functional action name" column 19e describes functional actions of the conference participant. In the case where a user manually provides an index, the user identifies each functional action, referring to the video display windows 16a through 16d of the graphical user interface 15. In accordance with the identified functional action, the user inputs a suitable index through a keyboard, so that the name of the functional action is shown in the corresponding column in the "functional action name" column 19e.

In the case where an index is automatically provided, the partial conference video extracting unit 4 extracts the partial audio and/or visual information containing one or more physical events of the conference participant from the conference audio and/or visual information, and the index providing unit S identifies the functional action abstracted from the one or more physical events in accordance with the partial conference audio and/or visual information. Based on the functional action, the index providing unit 5 provides an index for the partial conference audio and/or visual information. By doing so, the name of the functional action is displayed in the corresponding column in the "function action name" column 19e on the graphical user interface 15.

In the "role of actor" column 19f, an abstract role of the actor, such as "Initiator", "Replier", or "Observer", is written. In the "intended direction of action" column 19g, the intended direction of each functional action is written. In the case of a functional action of "Alice" asking "Betty" a question, the intended direction of the action is indicated as "Betty". In turn, the intended direction of the action of "Betty" replying to the question asked by "Alice" is indicated as "Alice".

As shown in the functional action description tables 19A and 19B, the graphical user interface 15 shows the data of each of the following items for each conference participant: index identifier, indexing start time, indexing end time, functional action, role of conference participant, and intended direction of action.

The track table 20 shows delays that are required for synchronizing operations. The track table 20 includes a track number column 20a showing track numbers to be used as video identifiers, a media identifier column 20b for identifying media, and a delay time column 20c showing relative delay times. The data contained in the track table 20 are generated and displayed in accordance with the number of sets of motion image data to be used (displayed on the video display windows 16a through 16d). In FIG. 3, the track numbers shown in the track number column 20a correspond to the video display windows 16a through 16d. More specifically, the motion image data corresponding to the track number 0 are displayed on the video display window 16a, the motion image data corresponding to the track number 1 are displayed on the video display window 16b, the motion image data corresponding to the track number 2 are displayed on the video display window 16c, and the motion image data corresponding to the track number 3 are displayed on the video display window 16d.

The track table 20 is used to specify or provide information as to data containing synchronized sets of motion image data. The track numbers in the track number column 20a represent the data order in the track table 20. The media identifier column 20b shows the identifiers such as names of the sets of motion image data or image data recorded on the conference video recording unit 3. The delay time column 20c shows the relative delay times with respect to the replay start time of a medium (or image data) specified by the system. The track table 20 shown in FIG. 3 indicates that the motion image data corresponding to the track number 3, or the motion image data corresponding to the media identifier "Video3", are delayed for 0.05 seconds with respect to the other motion image data. By designating the delay time of each set image data in the delay time column 20c, a user can synchronously replay two or more video images.

The scene description table 21 shows the descriptions of the contents and structure of image data that have a different degree of abstraction or a different meaning from the functional actions. More specifically, the scene description table 21 shows the data for describing each scene of the conference, including an identification number column 21a, a start time column 21b, an end time column 21c, a scene name column 21d, and a free text annotation column 21e. In the identification number column 21a, the numbers for specifying the scene order. In the start time column 21b and the end time column 21c, the start time and the end time of each scene are written. In the scene name column 21d, the scene names such as "discussion" and "presentation" are written. In the free text annotation column 21e, an event in each scene is written in text format.

The index data recorded in the functional action description tables 19A and 19B and the scene description table 21 can be presented in difference colors by the graphical user interface 15. More specifically, the graphical elements in the tables 19A, 19B, and 21 are two-dimensionally or three-dimensionally presented in difference colors, and are arranged in chronological order, so that users can graphically recognize each element.

Figure 4:
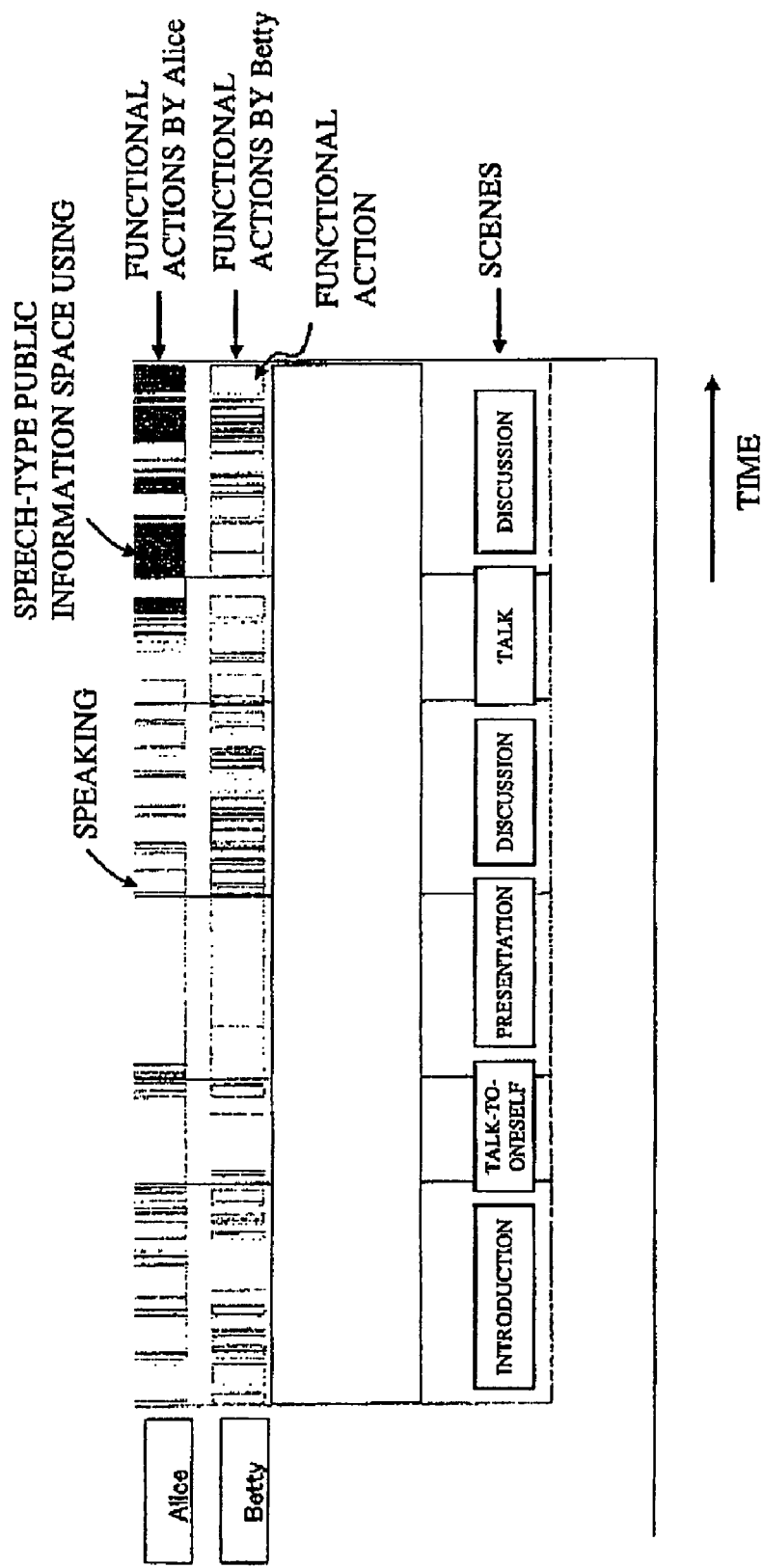
FIG. 4 shows an example of a two-dimensional graphical representation of functional actions.

Referring to FIG. 4, a two-dimensional graphical representation of functional actions will be described. FIG. 4 shows an example of the two-dimensional graphical representation of functional actions, i.e., the graphical representation of indexed conference videos. The graphical representation of the conference videos is displayed on the index display unit 8. In this embodiment, the conference participants are "Alice" and "Betty".

In FIG. 4, the functional actions of the conference participants "Alice" and "Betty are divided into two rows corresponding to the two participants, and are chronologically arranged. Also, the functional actions are shown in the form of time lines and a chart. In FIG. 4, the abscissa axis represents time. Each rectangle shown in the rows of "Alice" and "Betty" represents a functional action. An index is provided for each unit of functional actions. In FIG. 4, the graphical elements corresponding to the functional actions to be used for producing an video summary for reviewing some actions of "Alice" are shown in black.

The functional actions are represented by rectangles in different colors. For example, "Speaking" is shown in rose pink, "Attention Seeking" is in old rose pink, "speech continuing" is in bordeaux, "observing" is in carmine, "participating" is in scarlet, "non-participating" is in chinese red, "backchanneling" is in gold, "questioning" is in brown, "confirmatory questioning" is in beige, "speech-type thinking" is in bronze, "question-type thinking" is in Naples yellow, "confirmatory question-type thinking" is in cream yellow, "non-speech-type thinking" is in lemon yellow, "talking-to-oneself" is in sea green, "speech-type public information space using" is in cobalt green, "question-type public information space using" is in viridian, "confirmatory question-type public information space using" is in turquoise blue, "non-speech-type public information space using" is in cerulean blue, "participation-type private information space using" is in iron blue, "non-participation-type private information space using" is in ultramarine, "laughing" is in violet, "non-decipherable action" is in purple, "temporary leave" is in snow white, and "meeting room preparation" is in grey.

In the example shown in FIG. 4, labels and an index are provided for the scene descriptions: "introduction", "talk-to-oneself", "presentation", "discussion", and "talk". As shown in FIG. 4, the graphical user interface 15 displays the indexing result of the index providing unit 5 in the form of time lines or a chart, so that the attribute information of each video summary can be provided in a user-friendly fashion. In the example shown in FIG. 4, the graphical user interface 15 emphatically indicates a particular functional action, such as a change of audio speakers, a change of physical speakers, or a change of audio and physical speakers among the conference participants, through a graphical representation with a particular color, a particular shape, or a particular movement. Thus, a change of audio speakers, a change of physical speakers, and a change of audio and physical speakers among the conference participants, can be graphically represented.

Next, a case where index data are represented as XML data will be described. Here, the index data are generated by the index providing unit 5, and recorded on the index recording unit 6. FIG. 5 shows the first half of the index data represented as XML data, and FIG. 6 is the second half of the index data. In FIGS. 5 and 6, the index data are represented as XML data having MPEG-7 elements as root elements.

The Mpeg7 element includes a Description element. The Description element includes a ContentCollection element for describing sets of image data to be used for indexing, and a Session element for describing functional actions. In this example, the ContentCollection element includes two MultiMediaContent elements for describing the use of two sets of image data. Each MultiMediaContent element includes an Audio and/or visual element, and the Audio and/or visual element includes a MediaLocation element for describing the location of the corresponding image data, and a MediaTime element for describing the delay time required for synchronization.

The MediaLocation element includes a MediaUri element, and the MediaUri element has an identifier for identifying where the corresponding image data are stored. In this example, "file:/video1.mpg" and "file:/video2.mpg" are used as image data. The MediaTime element includes a MediaTimePoint element, and the MediaTimePoint element shows the relative delay time with respect to the reference time (the reference point) specified by the system. In this example, the delay time of "file:/video1.mpg" is 0.0 second, where is no delay. On the other hand, the delay time of "file:/video2.mpg" is 1.0 second, which means that "file:/video2.mpg" is 1 second behind "file:/video2.mpg". Therefore, the conference information processing apparatus 1 performs a replay or the like, delaying "file:/video2.mpg" 1 second with respect to "file:/1.mpg".

The Session element includes Actor elements that represent the conference participants, and a ConceptualSceneCollection that represents a set of scenes of the conference. In this example, there are two Actor elements that describe two conference participants. Each Actor element includes a Name element that describes the name of a conference participant, and a FunctionalActCollection element that represents a set of functional actions of the conference participant. In this example, the Name elements indicate that "Alice" and "Betty" are the conference participants. Each FunctionalActCollection element includes one or more FunctionalAct elements that represent functional actions. In this example, the functional actions of the conference participant "Alice" are represented by two FunctionalAct elements, and so are the functional actions of "Betty".

Each FunctionalAct element includes a MediaTime element that represents the period of time during which the corresponding functional action is conducted, a RoleOfActor element that represents the role of the conference participant, and an ActDirectionIntention element that represents the intended direction of the action. Each FunctionalAct element also has a "type" attribute that represents the type of functional action, and an "id" attribute that represents the identifier of the functional action. In this example, the functional actions of "Alice" are indicated as "Questioning" and "Observing", while the functional actions of "Betty" are indicated as "Observing" and "Speaking".

The MediaTime element in each FunctionalAct element includes a MediaTimePoint element and a MediaTimeDuration element. The MediaTimePoint element represents the start time of the corresponding functional action, and the MediaTimeDuration element represents the time duration of the functional action. The functional action of "Questioning"

conducted by the conference participant "Alice" lasted for 1 second, starting from the zero-second point, which is the reference time (the reference point) defined by the conference information processing apparatus 1. The role of the actor conducting this functional action (RoleOfActor) is indicated as "Initiator", and the intended direction of the action is indicated as "Betty" in this example.

The ConceptualSceneCollection element includes one or more ConceptualScene elements that represent scenes. Each ConceptualScene element includes a TextAnnotation element that represents the contents of the corresponding scene, and a MediaTime element that represents the time with respect to the scene. The TextAnnotation element includes a FreeTextAnnotation element. In this example, the FreeTextAnnotation element indicates that the scene is a "discussion". The corresponding MediaTime element includes a MediaTimePoint element and a MediaDuration element that represent the start time of the scene and the time duration of the scene, respectively. In this example, the "discussion" lasted for 60 seconds, starting from the zero-second point, which is the reference time point.

Figure 7:
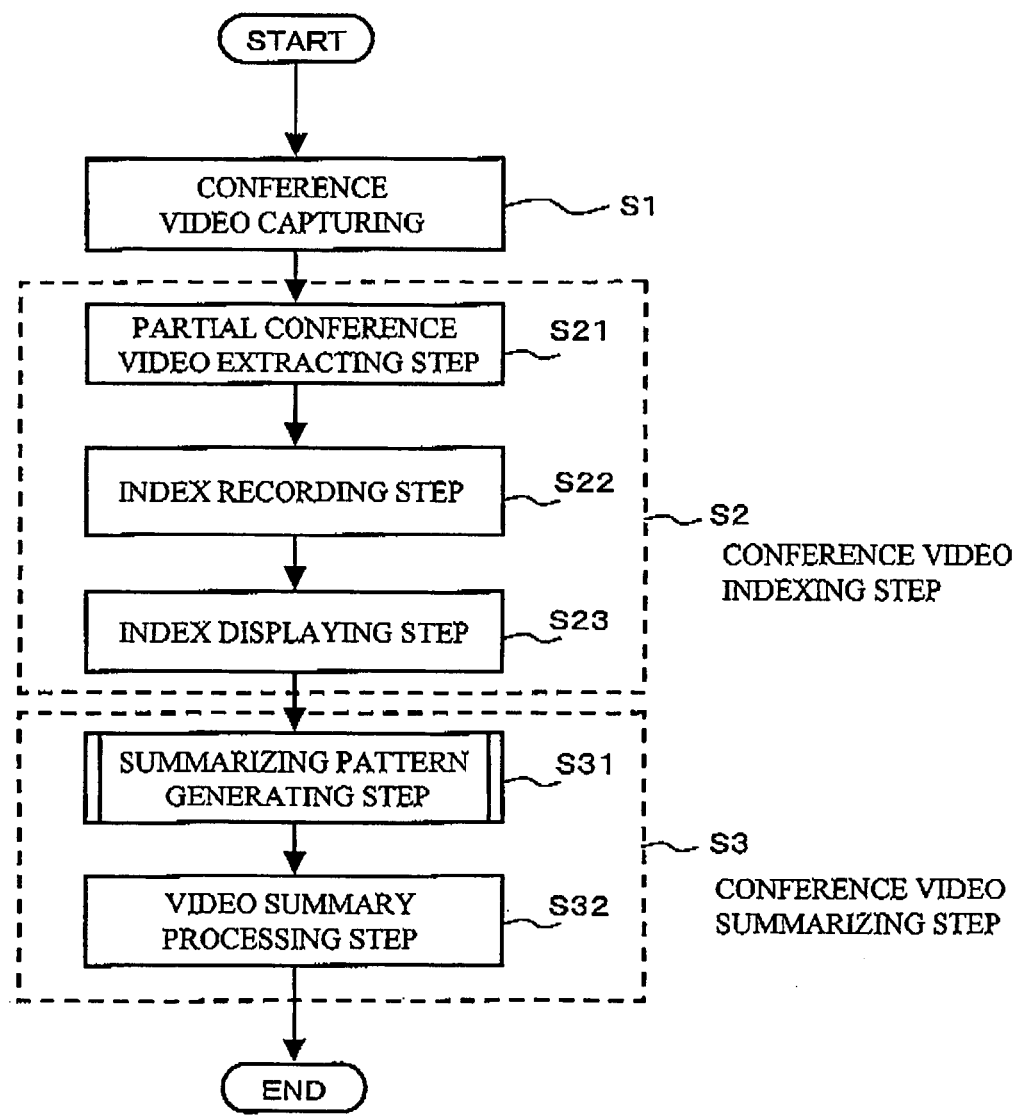
FIG. 7 is a flowchart of a conference recording process.

Next, the process of manually providing index data to partial conference videos and generating video summary data for the participants' functional actions will be described. The process of automatically generating and providing index data in accordance with the participants' functional actions will be described later as a second embodiment of the present invention. FIG. 7 is a flowchart of a conference recording process. This conference recording process includes a conference video capturing step S1, a conference video indexing step S2, and a conference video summarizing step S3.

In the conference video capturing step S1, conference video data consisting of motion image data captured by the conference video pickup unit 2 and audio data captured by the microphone system are recorded on the conference video recording unit 3. The conference videos recorded on the conference video recording unit 3 are displayed on the conference video display unit 7, upon request from a user. Users can refer to the conference video data (the motion image data of the conference) through the video display windows 16a through 16d on the graphical user interface 15 shown in FIG. 3.

Therefore, synchronize sets of motion image data with each other, a user designates the track number column 20a, the media identifier column 20b, and the delay time column 20c in the track table 20. The data of the track number column 20a, the media identifier column 20b, and the delay time column 20c in the track table 20, are transmitted from the index providing unit 5 to the synchronization unit 9. Using the data, the synchronization unit 9 synchronizes the sets of image data, which have been recorded on the conference video recording unit 3, with one another.

The conference video indexing step S2 will now be described. The conference video indexing step 32 includes a partial conference video extracting step S21, an index recording step S22, and an index displaying step S23. In the partial conference video extracting step S21, the partial conference video extracting unit 4 extracts partial conference videos from the conference video data recorded on the conference video recording unit 3.

In the index recording step S22, index data in accordance with each functional action of the participants are provided for the partial conference video data extracted in the partial conference video extracting step S21. The index providing is performed by a user through the graphical user interface 15. The index data in the form of XML data shown in FIGS. 5 and 6, for example, are recorded on the index recording unit 6. In the index displaying step S23, the index data as XML data recorded on the index recording unit 6 in the index recording step S22 are then shown as a chart on the graphical user interface 15 to the user.

In the conference video indexing step S2, handling the image data replay button 17a on the control panel 17, a user watches the motion image data displayed on the video display windows 16a through 16d, and listens to the audio data through the speaker system. While doing so, the user observes the functional actions of the conference participants, which are the contents of the image data, and writes the observed functional actions in the functional action description table 19A and 19B. More specifically, in accordance with the functional actions of the conference participants, the user fills in the "identification number" column 19b, the "start time" column 19c, the "end time" column 19d, the "functional action name" column 19e, the "role of actor" column 19f, and the "intended direction of action" column 19g. Here, the start time and the end time to be written in the start time column 19c and the end time column 19d can be obtained from the corresponding image data.

The functional action description tables 19A and 19B are a representation of the index data recorded on the index recording unit 6 through the graphical user interface 15, and are also the embodiment of the index providing unit 5 and the index display unit 8.

Also, the operation of a user referring to particular (or partial) image data through the control panel 17 is equivalent to the image data extracting operation performed by the partial conference video extracting unit 4 of the conference information processing apparatus 1 In the conference video indexing step S2, handling the image data replay button 17a on the control panel 17, a user watches the motion image data displayed on the video display windows 16a through 16d, and listens to the audio data supplied through the speaker system. While doing so, the user identifies each scene in the image data, and writes the corresponding scene name (such as "discussion" or "presentation") in the scene name column 21d in the scene description table 21. The user also fills in the identification number column 21a, the start time column 21b, the end time column 21c, and the free text annotation column 21e in the scene description table 21.

The conference video summarizing step S3 will be described in detail. In the conference video summarizing step S3, various image summaries are generated in accordance with various purposes. The conference video summarizing step S3 includes a summarizing rule generating step S31 and an video summary processing step S32.

In the summarizing rule generating step S31, the summarizing rule generating unit 10 generates summarizing rule data, and records the summarizing rule data on the summarizing rule recording unit 11. The summarizing rule display unit 12 then shows the recorded summarizing rule data to users. The graphical user interface 15 does not have a user interface that embodies the summarizing rule display unit 12. In the video summary processing step S32, the video summary generating unit 13 refers to the conference video data recorded on the conference video recording unit 3, the index data recorded on the index recording unit 6, and the summarizing rule data recorded on the summarizing rule recording unit 11. In accordance with the index data and the summarizing rule data, the video summary generating unit 13 edits the conference video data, and generates summarized conference video data.

In the video summary processing step S32, the video summary generating unit 13 compares the predetermined maximum partial image time duration with the time duration of each set of partial image data. Using the partial image data not exceeding the predetermined time duration among all the existing partial image data, the video summary generating unit 13 produces a summarized conference video based on the conference audio and/or visual information. The predetermined maximum partial image time duration may be 10 seconds, for example. If the time duration of a set of partial image data exceeds 10 seconds, only the first 10 seconds of the partial image data can be used as the data source for video summary data.

The conference video summary data generated by the video summary generating unit 13 are recorded on the video summary recording unit 14. The recorded conference video summary data are displayed on the conference video display unit 7. The video summary processing step S32 may be initiated by a user designating an item in the summary menu 18b in the menu 18.

Figure 8:
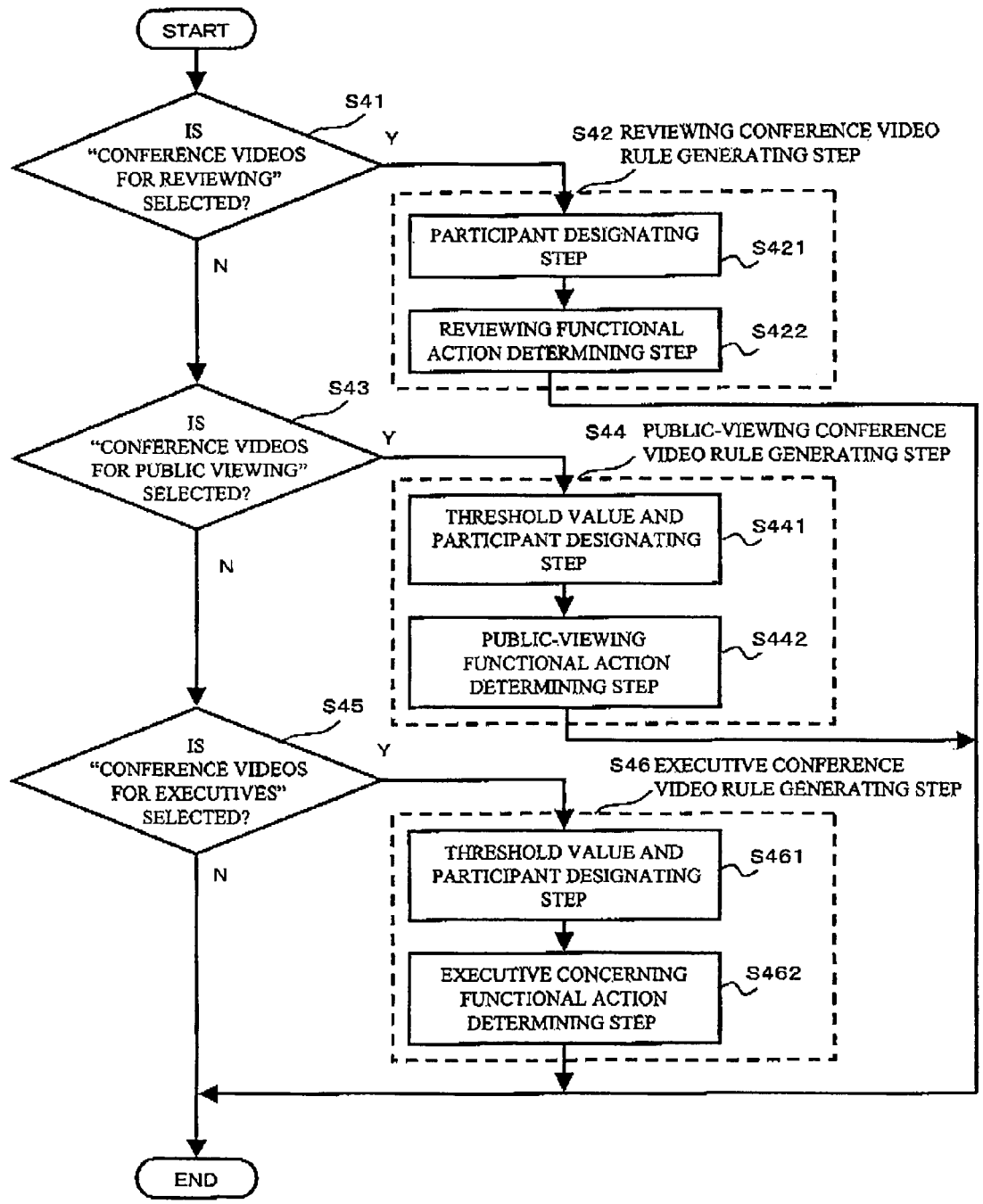
FIG. 8 is a flowchart of the detailed procedures of the summarizing rule generating step shown in FIG. 7.

Referring now to FIG. 8, the summarizing rule generating step S31 will be described in detail. FIG. 8 is a flowchart of the detailed procedures of the summarizing rule generating step S31. The summarizing rule generating step S31 starts from selecting an item from "conference videos for reviewing", "conference video for public viewing", and "conference videos for executives" in the summary menu 18b. Here, the conference videos for reviewing are useful for conference participants to review the video images of the conference they attended. The conference videos for public viewing are useful for those who did not attend the conference but are allowed to view the video images of the conference. The conference videos for executives are useful for company executives to view the video images of the conference.

In step S41, the summarizing rule generating unit 10 determines whether "conference videos for reviewing" is selected. If "conference videos for reviewing" is selected, the operation moves on to step S42. If "conference videos for reviewing" is not selected, the operation moves on to step S43. In step S42, which is a reviewing conference video rule generating step, the summarizing rule generating unit 10 concentrates on "active functional actions" or "thought-stating functional actions" among functional actions. In a participant designating step S421, the name of the participant to be reviewed is designated by a user through a keyboard or the like. In a reviewing functional action determining step S422, the summarizing rule generating unit 10 refers to the index data recorded on the index recording unit 6, and then determines whether there are index data corresponding to "active functional actions" or "thought-stating functional actions".

If there are the index data corresponding to either "active functional actions" or "thought-stating functional actions", the summarizing rule generating unit 10 generates an video summary generating rule to pick up the corresponding partial conference video data as a data source that might be used for producing an video summary for reviewing. The summarizing rule generating unit 10 also generates an video summary generating rule to pick up the partial image data corresponding to the scenes of "discussion" from the existing partial image data, and to set the picked partial image data as a second data source that might be used for producing an video summary for reviewing. The summarizing rule generating unit 10 then outputs the rules as the conference video rule data for reviewing to the summarizing rule recording unit 11.

Here, the "active functional actions" include functional actions such as "Speaking", "Questioning", "Speech-Type Public Information Space Using", "Question-Type Public Information Space Using", and "Non-Speech-Type Public Information Space Using". The functional actions to be processed in the reviewing functional action determining step S422 are the functional actions relating to the participant designated in the participant designating step S421.

In step S43, the summarizing rule generating unit 10 determines whether "conference videos for public viewing" is selected. If "conference videos for public viewing" is selected, the operation moves on to step S44. If "conference videos for public viewing" is not selected, the operation moves on to step S45. In the public-viewing conference video rule generating step S44, the summarizing rule generating unit 10 deals with one of the following functional actions: "Speaking", "Questioning", "Speech-Type Thinking", or "Speech-Type Public Information Space Using".

In a threshold value and participant designating step S441, threshold value data to be used for generating an video summary are designated by a user through a keyboard or the like. The threshold value data may be provided beforehand as a preset value by the conference information processing apparatus 1. The conference participant to be viewed is also designated by a user through a keyboard or the like. The threshold value data represent the ratio of the time duration of the scene to be viewed, to the total time duration of the existing partial image data. Here, the time duration of a scene is defined as the difference between the start time and the end time of the scene.

In a public-viewing functional action determining step S442, the summarizing rule generating unit 10 refers to the index recording unit 6, and determines whether there are index data corresponding to any of the following functional actions: "Speaking", "Questioning", "Speech-Type Thinking", and "Speech-Type Public Information Space Using". If there are the index data corresponding to any of the functional actions "Speaking", "Questioning", "Speech-Type Thinking", and "Speech-Type Public Information Space Using", the summarizing rule generating unit 10 generates an image summarizing rule to pick up the corresponding partial conference video data as a data source that might be used for producing conference videos for public viewing.

If the ratio of the time duration of the scene in the partial image data corresponding to a functional action to be processed, to the total time duration of the partial image data, exceeds the value represented by the threshold value data designated in the threshold value and participant designating step S441, the summarizing rule generating unit 10 generates an video summary generating rule to pick up the partial image data as a second data source that might be used for producing conference videos for public viewing. The summarizing rule generating unit 10 then outputs the generated rules as the public-viewing conference video generating rule data to the summarizing rule recording unit 11. In the public-viewing functional action determining step S442, the functional actions to be processed to produce an video summary are the functional actions relating to the conference participant designated in the threshold value and conference participant designating step S441.

In step 545, the summarizing rule generating unit 10 determines whether "conference videos for executives" is selected. If "conference videos for executives" is selected, the operation moves on to step S46. If "conference videos for executives" is not selected, the summarizing rule generating operation comes to an end. In the executive conference video rule generating step S46, the summarizing rule generating unit 10 deals with any of the functional actions, "Speaking", "Speech-Type Thinking", and "Speech-Type Public Information Space Using".

In a threshold value and participant designating step S461, threshold value data to be used for producing an video summary are designated by a user through a keyboard or the like.

The threshold value data may be provided beforehand as a preset value by the conference information processing apparatus 1. The conference participant to be viewed is also designated by a user through a keyboard or the like. The threshold data represent the ratio of the time duration of a scene to be viewed, to the total time duration of the existing partial image data.

In an executive concerning functional action determining step S462, the summarizing rule generating unit 10 refers to the index recording unit 6, and determines whether there are index data corresponding to any of the following functional actions: "Speaking", "Speech-Type Thinking", and "Speech-Type Public Information Space Using". If there are the index data corresponding to any of the functional actions "Speaking", "Speech-Type Thinking", and "Speech-Type Public Information Space Using", the summarizing rule generating unit 10 generates summarizing rule data to pick up the corresponding partial conference video data as a data source that might be used for producing conference videos for executives.

The summarizing rule generating unit 10 also generates summarizing rule data to pick up the partial image data corresponding to a scene "discussion" or "presentation" from the existing partial image data that might be used as data sources for producing conference videos for executives, and to set the picked partial image data as a second data source that might be used for producing conference videos for executives. If the ratio of the time duration of the scene in the partial image data corresponding to a functional action to be viewed, to the total time duration of the partial image data, exceeds the value represented by the threshold value data designated in the threshold value and participant designating step S461, the summarizing rule generating unit 10 generates an video summary generating rule to pick up the partial image data as a third data source that might be used for producing conference videos for executives. The summarizing rule generating unit 10 then outputs the generated summarizing rule data as the executive conference video generating rule data to the summarizing rule recording unit 11. In the executive concerning functional action determining step S462, the functional actions to be processed to produce an video summary are the functional actions relating to the conference participant designated in the threshold value and conference participant designating step S461.

Next, the procedures of the conference video summarizing step S3 will be described in detail. There are three different types of conference video summary in accordance with situations. By selecting one of the items "conference videos for reviewing", "conference videos for public viewing", and "conference videos for executives", a conference video summary is produced accordingly.

The case of "conference videos for reviewing" will be first described. In the case of "conference videos for reviewing", the video summary generating unit 13 uses the reviewing conference video rule data generated in the reviewing conference video rule generating step S42, so as to extract the index data to be reviewed from the index data recorded on the index recording unit 6. The video summary generating unit 13 extracts the image data or the partial image data relating to the extracted index data from the conference video recording unit 3, and then produces reviewing conference video data that contain the data as to the following "active functional actions": "Speaking", "Questioning", "Speech-Type Public Information Space Using", "Question-Type Public Information Space Using", and "Non-Speech-Type Public Information Space Using", as well as "speech-type thinking functional actions".

The case of "conference videos for public viewing" will now be described. In the case of "conference videos for public viewing", the video summary generating unit 13 uses the public-viewing conference video rule data generated in the public-viewing conference video rule generating step S44, so as to extract the index data to be viewed from the index recording unit 6. The video summary generating unit 13 extracts the image data or the partial image data relating to the extracted index data from the conference video recording unit 3, and then produces public-viewing conference video data that contain the data as to the following functional actions: "Speaking", "Questioning", "Speech-Type Thinking", and "Speech-Type Public Information Space Using".

The case of "conference videos for executives" will be described. In the case of "conference videos for executives", the video summary generating unit 13 uses the executive conference video rule data generated in the executive conference video rule generating step S46, so as to extract the index data to be viewed from the index recording unit 6. The video summary generating unit 13 extracts the image data or the partial image data relating to the extracted index data, and then produces executive conference video data that contain the data as to the following functional actions: "Speaking", "Speech-Type Thinking", and "Speech-Type Public Information Space Using".

Figure 9:
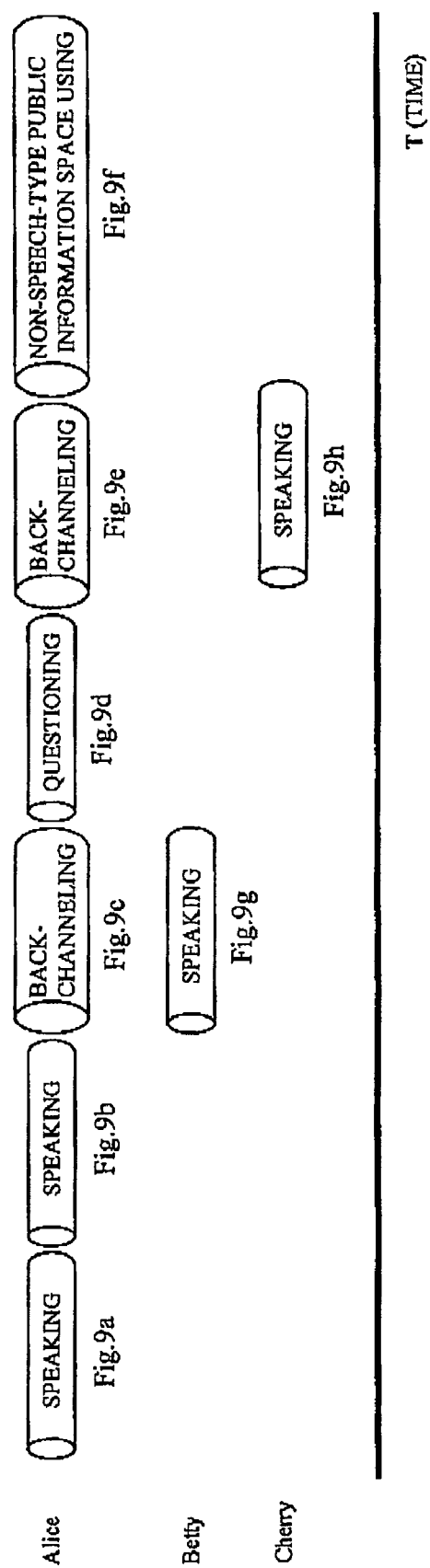
FIG. 9 is a time line chart illustrating a situation in which three people participate in a conference, and the functional actions of each of the participants are defined as in the first embodiment of the present invention.
Figure 10:
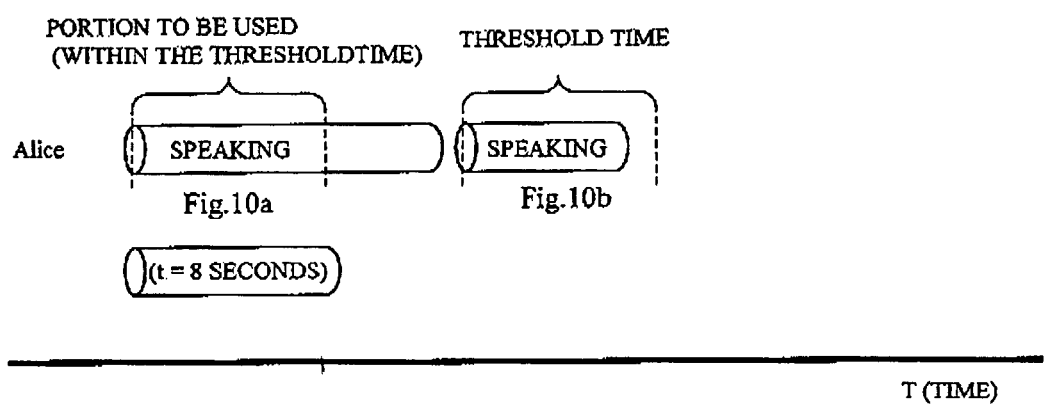
FIG. 10 shows a functional action with a time duration that is longer than a predetermined threshold value, and a functional action with a time duration that is shorter than the predetermined threshold value.

Referring now to FIGS. 9 and 10, the summarizing process to be performed on the three types of conference video summary will be described. The functional action data to be used in the summarizing process will also be explained below. FIG. 9 shows time lines that were obtained in the case where the conference participants were Alice, Betty, and Cherryl, and the functional actions of the participants were defined as described above in accordance with this embodiment. In short, the time lines shown in FIG. 9 represent the time durations of functional actions. In FIG. 9, the abscissa axis indicates time (elapsed time).

As can be seen from FIG. 9, in the conference, Alice conducted the following functional actions: (a) Speaking, (b) Speaking, (c) Backchanneling, (d) Questioning, (e) Backchanneling, and (f) Non-Speech-Type Public Information Space Using. As also can be seen from FIG. 9, Betty performed (g) Speaking, and Cherryl performed (h) Speaking. In the reviewing conference video rule generating step S42, an image summarizing rule is generated for producing an video summary to be used by the conference participants to review the conference.

In the public-viewing conference video rule generating step S44, an image summarizing rule is generated for producing an video summary to be used by those who did not attend the conference but are allowed to view the conference through the video summary after the conference. Likewise, in the executive conference video rule generating step S46, an image summarizing rule is generated for producing an video summary to be used by executives, directors, and managers under whom the conference participants are working, and who wish to view the conference for reference.

For example, having attended the conference, Alice can review the conference video through the "conference videos for reviewing". Diana, who did not attend the conference, can view the conference video through the "conference videos for public viewing". Elly, who is a company executive and a supervisor for Alice, can refer to the conference video through the "conference videos for executives". Here, Diana did not attend the subject conference, which means that she did not physically attend the conference, or that she did not participate in the video conference (through a device such as a video monitor). This is completely different from "Non-Participating", but means that she did not take any part in the conference.

When Alice uses the "conference videos for reviewing", she designates herself, i.e., "Alice", as the subject participant in the participant designating step S421. By designating herself as the participant, Alice can designate only the functional actions of herself as the objects to be reviewed. Accordingly, the functional actions to be reviewed by Alice with respect to the "conference videos for reviewing" are restricted to: (a) Speaking, (b) Speaking, (c) Backchanneling, (d) Questioning, (e) Backchanneling, and (f) Non-Speech-Type Public Information Space Using shown in FIG. 9. In the step of generating a reviewing conference video rule, only the "active functional actions" and the "speech-type thinking functional actions" are concerned. Therefore, the summarizing process is carried out, with the functional actions of (a) Speaking, (b) Speaking, (d) Questioning, and (f) Non-Speech-Type Public Information Space Using being the objects to be summarized.

When Diana, who did not attend the conference, uses the "conference videos for public viewing", she first designates a conference participant. For example, Diana designates Alice in the threshold value and participant designating step S441. Accordingly, the functional actions to be summarized among the "conference videos for public viewing" are restricted to: (a) Speaking, (b) Speaking, (c) Backchanneling, (d) Questioning, (e) Backchanneling, and (f) Non-Speech-Type Public Information Space Using shown in FIG. 9.

As described above, among the "conference videos for public viewing", the functional actions of "Speaking", "Questioning", "Speech-Type Thinking", and "Speech-Type Public Information Space Using" are the objects to be summarized. Therefore, the summarizing process is carried out, with only the functional actions of (a) Speaking, (b) Speaking, and (d) Questioning shown in FIG. 9 being the objects to be summarized. When Elly, who is an executive, uses the "conference videos for executives", she might designate Alice, Betty, and Cherryl in the threshold value and participant designating step S461. In such a case, only the functional actions of (a) Speaking and (b) Speaking by Alice, (g) Speaking by Betty, and (h) Speaking by Cherryl shown in FIG. 9 are the objects to be summarized in the summarizing process. This is because only the functional actions of "Speaking", "Speech-Type Thinking", and "Speech-Type Public Information Space Using" are designated as the objects to be summarized in the executive conference video rule generating step S46.

Referring now to FIG. 10, the threshold value processing procedures will be described. A threshold value can be used to produce a more compact video summary. For example, a threshold value can be used to set the upper limit to the time duration of each functional action to be summarized. FIG. 10 shows a functional action with a longer time duration than a threshold value, and a functional action with a shorter time duration than the threshold value. In FIG. 10, the abscissa axis indicates time (elapsed time). As can be seen from FIG. 10, Alice conducted the functional actions of (a') Speaking and (b') Speaking.

To set the upper limit to the time duration of a functional action to be summarized, the threshold value t is set at 8 seconds, for example. The first Speaking (a') by Alice lasted for 10 seconds, and the second Speaking (b') by Alice lasted for 6 seconds. As the functional action of "Speaking" is processed in an image summarizing operation, with the threshold value t being 8 seconds, only the data of the first 8 seconds of the first Speaking (a') are to be processed. Meanwhile, the entire second Speaking (b'), which is shorter than the threshold value t of 8 seconds, is to be processed.

Each of the functional actions described above will be specifically defined. "Speaking" is put into an independent functional action category, and is most often written or explained as a participant speaks. "Speaking" is associated with a linguistic action. "Questioning" is put into another category, but a rhetoric question is classified as "Speaking" "Attention Seeking" indicates the action of a participant wishing to start talking in a discussion.

The actions of "Attention Seeking" can be divided into voice actions and visual actions. To obtain the right to speak, a participant raises his/her hand to indicate he/she wishes to start talking, or makes noise to attract the other participants' attention. "Speech Continuing" indicates the same action as the "Attention Seeking", except for the action of maintaining the right to speak. A speaking participant performs "Speech Continuing", when another participant tries to obtain the right to speak. "Observing" indicates the action of a participant intentionally looking at the attention grabbing point, without conducting any other action. The "attention grabbing point" literally indicates an object or an action of a person that attracts the participants' attention. "Participating" indicates the action of a participant unintentionally looking at the attention grabbing point. The participant may open his/her eyes wide in astonishment, or shift in his/her chair. Detecting (or identifying) the intended direction of such an action is not as difficult as one might think, when only "gazing" is taken into consideration.

An object at which a person is gazing should be important, and therefore, the gazing direction of this action at the beginning and at the end gives a clue to the intended direction of the action. When another participant performs "Backchanneling" or the speaker somehow puts emphasis on his/her speech (with a gesture or louder voice), the participants who are actually "participating" in the conference are supposed to look in the "intended direction of action". "Non-Participating" indicates the action of a participant who is intentionally involved in a matter completely irrelevant to the conference. Examples of "Non-Participating" actions include sleeping or talking on a phone.

"Backchanneling" indicates confirmation signs that each participant might give for continuing the discussion. Examples of "Backchanneling" actions include short audible responses such as nodding or "uh-huh". "Questioning" indicates the action of a participant asking a question in such a manner that the answerer can maintain the right to speak. "Confirmatory Questioning" indicates the action of a participant asking a question in such a manner as not to allow the answerer to speak. A confirmatory question is normally formed with a very short sentence. "Speech-Type Thinking" indicates the action of a participant thinking while talking. When a participant is looking up, the action of the participant can be determined to be a "Speech-Type Thinking" action. "Question-Type Thinking" indicates the action of a participant thinking with a question. "Confirmatory Question-Type Thinking" indicates the action of a participant thinking without talking. "Talking-to-Oneself" indicates the action of a participant talking to himself or herself. One of the signs of this action is the action of a participant who is looking down. This action is not intentionally directed to anyone.

"Statement-Type Public Information Space Using" indicates the action of a participant writing on a whiteboard or some other information space shared between two or more participants of the conference, while talking. "Question-Type Public Information Space Using" indicates the action of a participant writing on a whiteboard or some other information space shared between two or more participants of the conference, while asking a question. "Confirmatory Question-Type Public Information Space Using" indicates the action of a participant writing on a whiteboard or some other information space shared between two or more participants of the conference, while asking a confirmatory question. "Non-Speech-Type Public Information Space Using" indicates the action of a participant writing on a whiteboard or some other information space shared between two or more participants of the conference. Except for the "Non-Speech-Type Public Information Space Using" actions, the non-speech-type functional actions do not have any "intended direction of action". "Participation-Type Private Information Space Using" indicates the action of a participant being intentionally involved in a "private information space" while "participating" in the conference. Examples of the "Participation-Type Private Information Space Using" actions include writing on a sheet of paper and typing a note on a laptop computer. In this case, the participant might glance at the conference, and might even make a short remark or conduct a "Backchanneling" action. "Non-Participation-Type Private Information Space Using" indicates the action of a participant being intentionally involved in a "private information space" while "not participating" in the conference. "Laughing" literally indicates the action of a participant laughing. "Non-Decipherable Action" indicates that it is impossible to decipher the action or the intended direction of the action from the video.

In accordance with the first embodiment described so far, conference audio and/or visual information can be edited based on each functional action abstracted from one or more physical events. Accordingly, conference videos that are useful for those who wish to view the conference afterward can be provided.

Second Embodiment

A second embodiment of the present invention will now be described. In the second embodiment, the index providing unit 5 automatically generates index data in accordance with the functional actions of conference participants. More specifically, using a audio/non-audio section detecting technique, a voice recognition technique, and a gesture recognition technique, each functional action in image data is identified, and index data corresponding to the functional actions of the participants, as well as scenes identified by a clustering technique or the like, are automatically generated.

Figure 11:
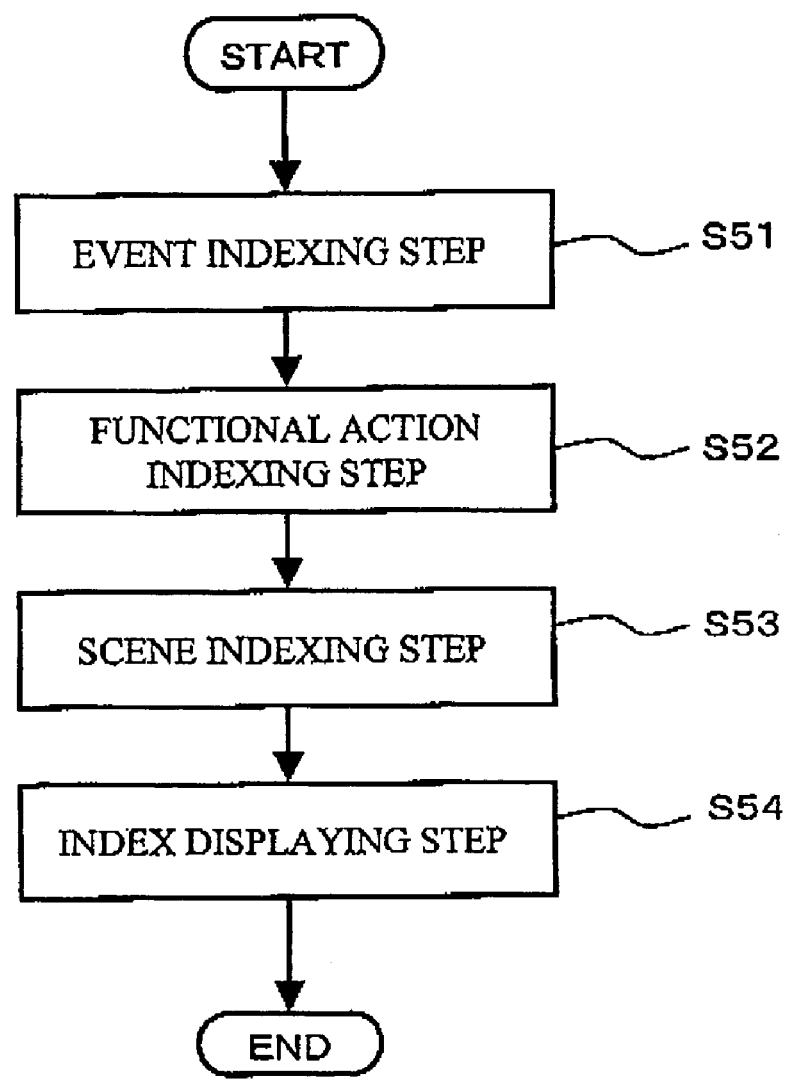
FIG. 11 is a flowchart of an index displaying operation.

FIG. 11 is a flowchart of an index displaying process. As can be seen from FIG. 11, this process includes an event indexing step S51, a functional action indexing step S52, a scene indexing step S53, and an index displaying step S54. The event indexing step S51, the functional action indexing step S52, and the scene indexing step S53, are more particular versions of the index recording step S22 described earlier.

In the event indexing step S51, the index providing unit 5 indexes the image data corresponding to the media layer 22*c*. More specifically, the index providing unit 5 identifies each of the physical events of the conference participants, such as glancing and nodding, from the partial conference video data extracted by the partial conference video extracting unit 4. The index providing unit 5 then provides an index and structures the image data. In the functional action indexing step S52, the index providing unit 5 indexes the image data corresponding to the functional action layer 22*b*. More specifically, the index providing unit 5 identifies each of the functional actions based on the index data as to the physical events structured as the media layer 22*c*. The index providing unit 5 then provides an index and structures the image data.

In the scene indexing step S53, the index providing unit 5 indexes the image data corresponding to the scene layer 22*a*. More specifically, the index providing unit 5 identifies each of the scenes based on the index data as to the functional actions structured as the functional action layer 22*b*. The index providing unit 5 then provides an index and structures the image data. In the index displaying step S54, the index displaying unit 8 graphically visualizes the index data structured as the media layer 22*c*, the functional action layer 22*b*, and the scene layer 22*a*, so that the index data can be presented to users as shown in FIG. 2.

Figure 12:
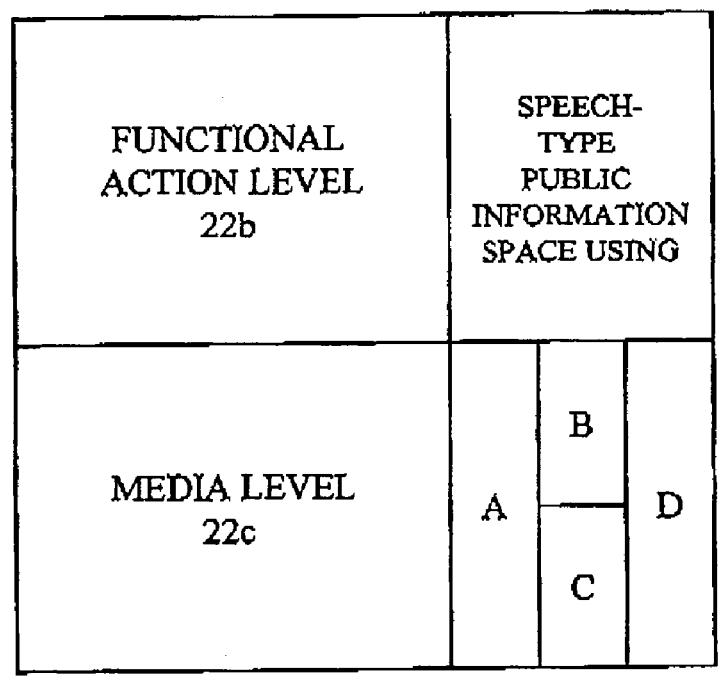
FIG. 12 shows an example of an image data structure in the functional layer and the media layer.

FIG. 12 shows an example structure of the image data corresponding to the functional action layer and the media layer. In the example shown in FIG. 12, there are four events (actions) of the media layer 22*c*. Event A represents the physical event of a participant leaving his/her seat. Event B represents the physical event of a participant speaking. Event C represents the physical event of a participant writing on a whiteboard. Event D represents the physical event of a participant taking a seat. Here, Event B and Event C are concurrent with each other. More specifically, there is a conference participant who is writing on a whiteboard while speaking. Based on the index data as to such an event, the action of this conference participant can be identified as "Speech-Type Public Information Space Using" on the corresponding functional action layer 22*b*.

To identify the boundary between each two scenes, it is possible to utilize the "Method of Detecting Moving Picture Cuts from a MPEG Bit Stream through Likelihood Ratio Test" (Kaneko, et al., IEICE Transactions D-II, vol. J82-D-II, No. 3, pp. 361-370, 1990). In the case where one scene consists of two or more cuts, the clustering technique disclosed in "An Interactive Comic Book Presentation for Exploring Video" (Boreczky, et al., CHI2000 CHI Letters, volume 2, issue 1, pp. 185-192, 2000) can be used to collectively handle the two or more cuts as a scene. In accordance with Boreczky, et al., all video frames are clustered by a so-called complete link method of a hierarchical agglomerative clustering technique.

To identify the functional actions of "Speaking" in image data (or partial conference video data), it is possible to use "Block Cepstrum Flux" disclosed in "Method of Detecting Timing for Presenting Subtitles in Television Program, Using Word Spotting and Dynamic Programming Technique" (Maruyama, et al.). If the number of sequential frames that are determined to be non-audio frames from the threshold value between audio data and non-audio data exceeds a predetermined number, the section of the non-audio frames is classified as a non-audio section, and all the remaining sections are classified as audio sections. By detecting those audio sections, the functional actions of "Speaking" in the image data can be identified.

In the case where a participant is making a hand gesture to obtain the right to speak ("Attention Seeking"), a conventional gesture recognition technique can be used to detect hand and body gestures from image data (or partial conference video data). For example, the device disclosed in Japanese Unexamined Patent Publication No. 2001-229398 can be used to detect gestures made by an actor from video images, and set parameters for the gestures in such a manner that the gestures can be reproduced. Tags are then added to the parameters. The parameters with the tags are stored, so that the parameters can be used for making characters in an animation move in a natural manner. Also, the device disclosed in Japanese Unexamined Patent Publication No. 2000-222586 can be utilized to efficiently describe the motion information corresponding to the objects in a video image.

More specifically, an accumulative motion histogram is produced by accumulating motion histograms, and a motion descriptor that efficiently describes the motion information corresponding to the objects in a video image is produced and is used for a video search.

Several techniques have also been suggested to construct a model method for accurately estimating the movements and structures of moving objects from sequential image frames, thereby recognizing gestures made by the moving objects. For example, the gesture moving image recognizing method disclosed in Japanese Unexamined Patent Publication No. 9-245178 can be used. More specifically, each of image frames that constitute a moving image is regarded as a point in a vector space, and the moving locus of each point is set as the feature parameter of each corresponding type of gesture. The feature parameter obtained in this manner is compared with the feature parameter of a reference pattern. Thus, the type of gesture can be accurately recognized.

The device disclosed in Japanese Unexamined Patent Publication No. 11-238142 can also be used. Gestures that can be seen in original motion images are specifically classified into various types, such as questioning (leaning forward) and agreeing (nodding). Therefore, an identification label to be added to each type of gesture is constructed, and the meaning of each gesture is extracted from each corresponding identification label. Thus, a script that describes the start time and the end time of each gesture can be produced. The moving picture processor disclosed in Japanese Unexamined Patent Publication No. 6-89342 can also be used. More specifically, images that constitute a motion image are inputted, and the affine deformation among the image frames is estimated from the changes of the locations of at least three feature points in the images. Accordingly, the movements and the structures of the moving objects can be detected from the changes of the locations of image feature amounts. The above gesture recognition techniques can be utilized for identifying functional actions such as "Attention Seeking" and "Backchanneling" in image data.

The functional action identifying operation to be performed by the index providing unit 5 will now be described. The index providing unit 5 calculates the time duration of each functional action from the logical sum of the time durations of one or more physical events. The time duration of each functional action can be determined from the start time and the end time of the corresponding functional action, and can be used in the functional action indexing process described above. In other words, the time duration of each functional action can be used in the image data structuring process. The index providing unit 5 also identifies functional actions in accordance with gestures made by each conference participant, movements of the mouse of each conference participant, movements of the eyes of each conference participant, movements of the head of each conference participant, the act of writing of each conference participant, the act of standing up from the chair of each conference participant, the act of typing on a predetermined input device of each conference participant, the facial expression of each conference participant, and the voice data of each conference participant, which are contained in the partial conference audio and/or visual information.

Figure 13:
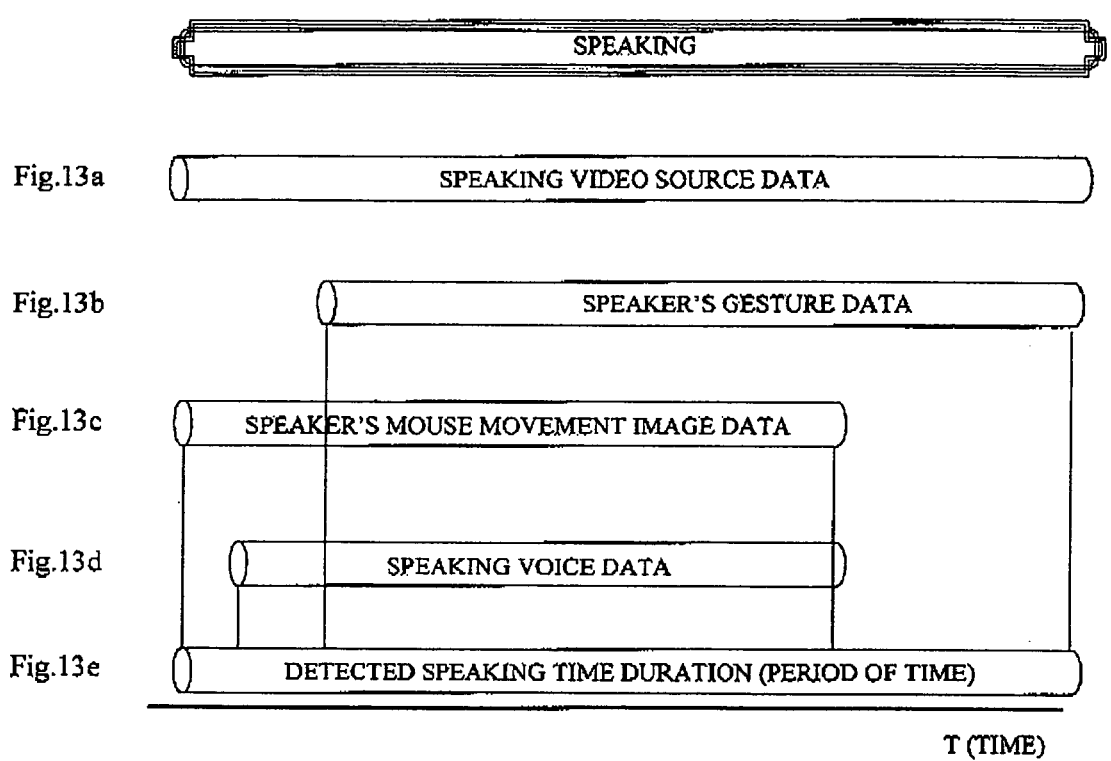
FIG. 13 is a time line chart of a functional action of "Speaking"

Referring now to FIG. 13, a case of "Speaking" will be described. FIG. 13 is a time line chart of a functional action of "Speaking". The abscissa axis in FIG. 13 indicates time (elapsed time). The time line chart in FIG. 13 shows: (a) "speaking video source data", (b) "speaker's gesture data", (c) "speaker's mouse movement image data", and (d) "speaking voice data". These data can be regarded as data in the above described media layer. Meanwhile, the data of (e) "detected speaking time duration (period of time)" are regarded as data in the functional action layer.

The "speaking video source data" in FIG. 13 are the motion image data of the speech, and serve as the data source for the "speaker's gesture data" and the "speaker's mouse movement image data". The partial conference video extracting unit 4 extracts the "speaker's gesture data" from the "speaking video source data" by a conventional gesture recognition technique. Likewise, the partial conference video extracting unit 4 extracts the "speaker's mouse movement image data" from the "speaking video source data". The index providing unit 5 determines the time duration of the "Speaking" of the functional action layer by calculating the logical sum of the time durations of the actions in the media layer, as shown in FIG. 14.

Figure 14:
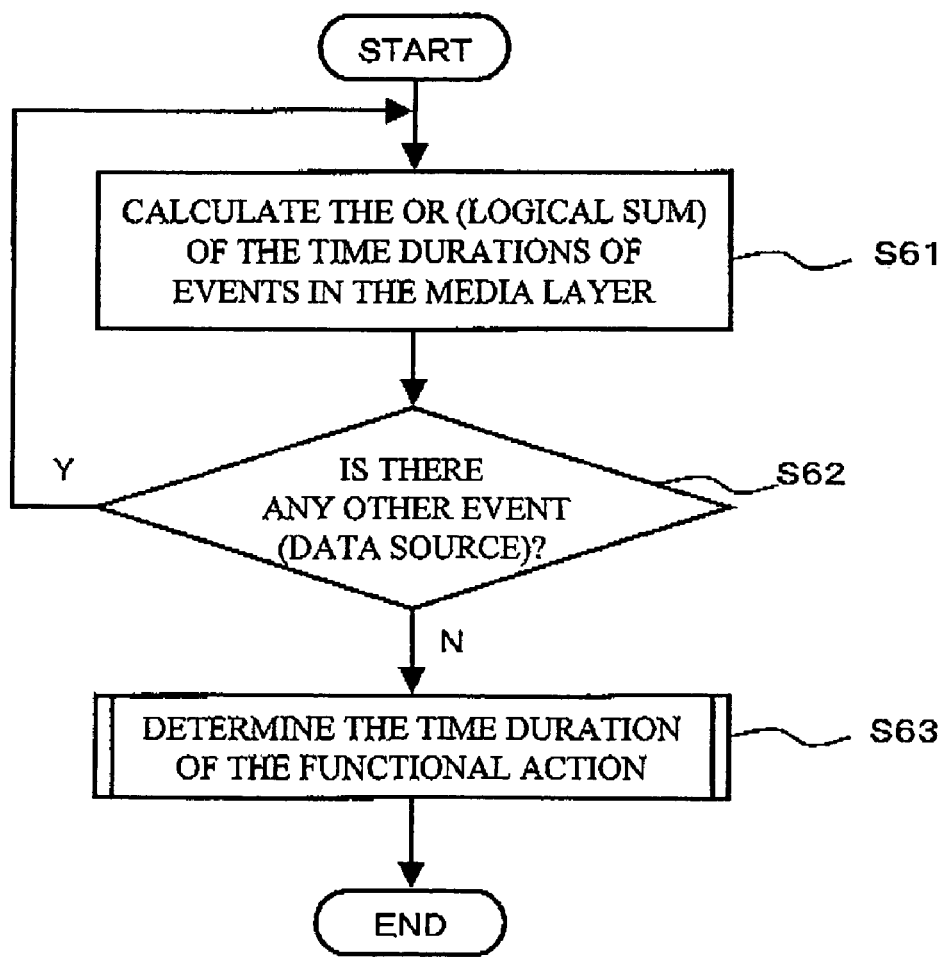
FIG. 14 is a flowchart of a functional action time duration determining process.

FIG. 14 is a flowchart of the functional action time duration determining process. This functional action time duration determining process includes a media-layer event time duration logical sum calculating step S61, an remaining event (data source) determining step S62, and a functional action time duration determining step S63. These steps are carried out by the index providing unit 5. Normally, a functional action can be identified by the time duration of one or more events of the media layer. Therefore, the index providing unit 5 repeats the media-layer event time duration logical sum calculating step S61 the same number of times as the number of corresponding events of the media layer. The index providing unit 5 determines whether step S61 should be repeated again in the other event (data source) determining step S62.

In the media-layer event time duration logical sum calculating step S61, the index providing unit 5 calculates the logical sum of the already calculated event time duration and the currently calculated event time duration on the time axis. In the functional action time duration determining step S63, the index providing unit 5 calculates the difference between the start time and the end time of the event, based on the time logical sum obtained in step S61. The index providing unit 5 then determines the difference to be the time duration of the corresponding functional action. In this manner, the time duration of each functional action is determined by the difference between the start time and the end time. In the case where the time duration of a "Speaking" functional action is to be determined, the index providing unit 5 calculates the logical sum of the time durations of the media-layer events, which are the "speaker's gesture data", the "speaker's mouse movement image data", and "speaking voice data" shown in FIG. 13. Thus, the time duration of the "Speaking" functional action is determined.

Figure 15:
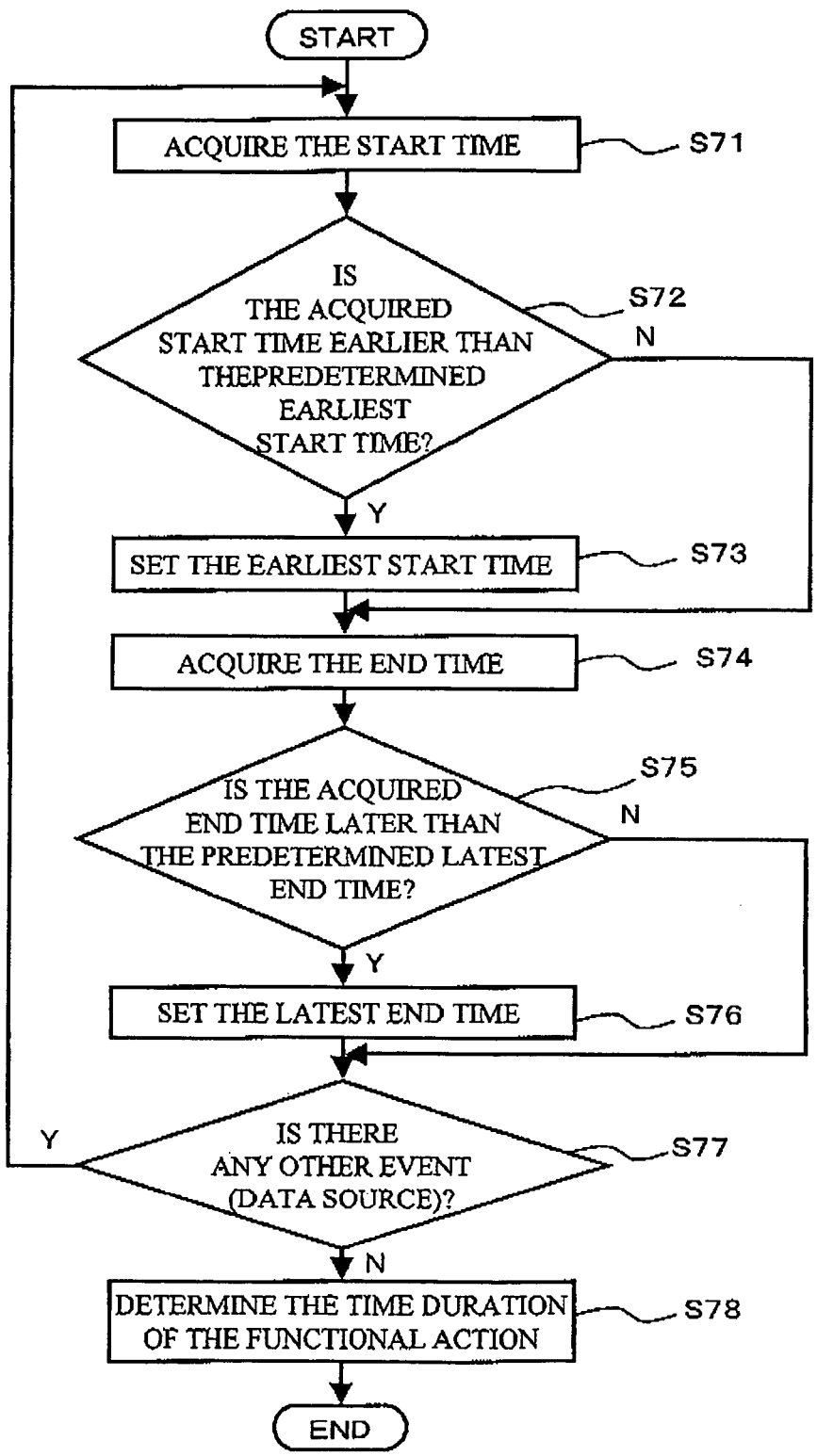
FIG. 15 is a flowchart of a functional action time duration determining process in greater detail.

Referring now to FIG. 15, the functional action time duration determining step S63 shown in FIG. 14 will be described in detail. FIG. 15 is a flowchart of the functional action time duration determining process. As shown in FIG. 15, the functional action time duration determining step S63 includes a start time acquiring step S71, an earliest start time comparing step S72, an earliest start time setting step S73, an end time acquiring step S74, a latest end time comparing step S75, a latest end time setting step S76, an other event (data source) determining step S77, and a functional action time duration determining step S78. These steps are to be carried out by the index providing unit 5. In the start time acquiring step S71, the index providing unit 5 acquires the start time of an event having a media layer.

In the earliest start time comparing step S72, the index providing unit 5 compares a predetermined earliest start time with the event start time acquired in the start time acquiring step S71. If the start time acquired in step S72 is earlier than the predetermined earliest start time, the index providing unit 5 carries out the earliest start time setting step S73. If the start time acquired in step S71 is the same as or later than the predetermined earliest start time, the index providing unit 5 moves on to the end time acquiring step S74. In the earliest start time setting step S73, the index providing unit 5 sets the start time acquired in step S71 as the earliest start time. In the end time acquiring step S74, the index providing unit 5 acquires the end time of the event having the corresponding media layer.

In the latest end time comparing step S75, the index providing unit 5 compares a predetermined latest end time with the event end time acquired in the end time acquiring step S74. If the end time acquired in step S74 is later than the predetermined latest end time, the index providing unit 5 carries out the latest end time setting step S76. If the end time acquired in step S74 is the same as or earlier than the predetermined latest end time, the index providing unit 5 moves on to the other event (data source) determining step S77. In the other event (data source) determining step S77, the index providing unit 5 determines whether there is any other event (or a data source) relating to the functional action. If there is another event, the operation returns to the start time acquiring step S71 for the event.

If there is not any other event relating to the functional action, the index providing unit 5 carries out the functional action time duration determining step S78. In the functional action time duration determining step S78, the index providing unit 5 calculates the difference between the earliest start time set in the earliest start time setting step S73 and the latest end time set in the latest end time setting step S76. The index providing unit 5 then determines the difference to be the time duration of the functional action. In this manner, the time duration of a functional action is determined by the difference between the earliest start time and the latest end time. Through the above procedures, the "detected speaking time duration (period of time)" can be calculated from the "speaker's gesture data", "speaker's mouse movement image data", and the "speaking voice data" shown in FIG. 13.

Next, the process of extracting each physical event in the media layer from the "speaking video source data" shown in FIG. 13 will be described. This process is carried out by the partial conference video extracting unit 4. To extract the "speaker's gesture data" from the "speaking video source data" shown in FIG. 13, the software-version real time three-dimensional movement measuring system "SV-Tracker" or the image movement measuring software "Pc-MAG" (both manufactured by OKK INC.) can be used.

In the case where SV-Tracker is used, each conference participant needs to wear a marker for three-dimensional measurement of gestures beforehand. Using a so-called IEEE 1394 digital camera, the "speaker's gesture data" can be extracted from the "speaking video source data" captured by the digital camera. In the case where Pc-MAG is used, the above described marker is not required, but measurement points for measuring gestures need to be set with respect to the images corresponding to the "speaking video source data", so that the "speaker's gesture data" can be extracted from the "speaking video source data".

As a gesture recognition technique, the method disclosed in "Method of Estimating the Location and the Hand Area of a Person by a Multi-Eye Camera for Gesture Recognition" (Tominaga, et al., IPSJ Technical Report, Vol. 2001, No. 87, Human Interface 95-12 (Sep. 13, 2001), pp. 85-92) can be used. To extract the "speaker's mouse movement image data" from the "speaking video source data" shown in FIG. 13, the method disclosed in "Speech Start and End Detection from Movements of Mouse and Surrounding Area" (Murai, et al., Proceedings of IPSJ National Conference in Autumn 2000, Vol. 2, pp. 169-170, 2000) can be used.

In the process of extracting the "speaking voice data" shown in FIG. 13, the "Speech for Java (a registered trademark)" (produced by International Business Machines Corporation) can be used to extract the audio data of the actual speech audio sections from general audio data. Also, the voice recognition method disclosed in "Basics of Voice Recognition Description and Development of Application Programs" (Interface (August 1998), pp. 100-105) can be used to extract speech audio data.

Figure 16:
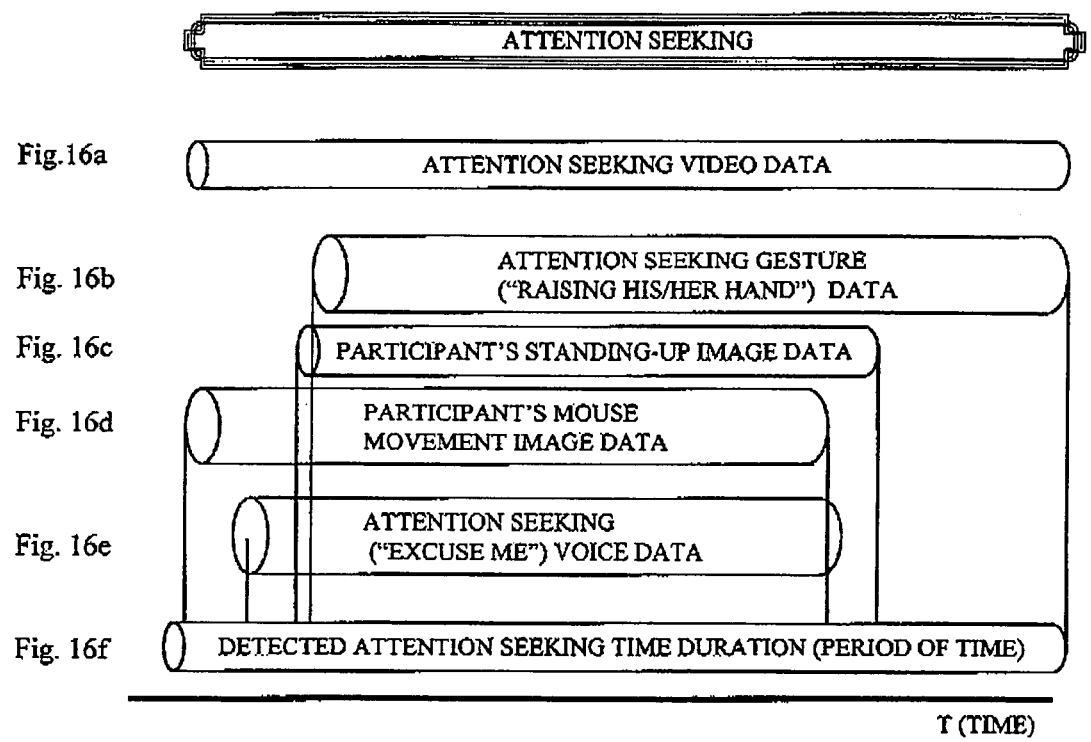
FIG. 16 is a time line chart of a functional action of "Attention Seeking"

Referring now to FIG. 16, a case of "Attention Seeking" will be described. FIG. 16 is a time line chart of a functional action of "Attention Seeking". The abscissa axis in FIG. 16 indicates time (elapsed time). This time line chart shows: (a) "attention seeking video source data", (b) "attention seeking gesture (raising his/her hand) data", (c) "participant's standing-up image data", (d) "participant's mouse movement image data", and (e) "attention seeking ("excuse me") voice data", which are regarded as data in the above described media layer. The time line chart also shows (f) "detected attention seeking time duration (period of time)", which is regarded as data in the functional action layer.

The "attention seeking video source data" in FIG. 16 are the motion image data of the attention seeking action, and serve as the data source for the "attention seeking gesture data", "participant's standing-up image data", and the "participant's mouse movement image data". The partial conference video extracting unit 4 extracts the "attention seeking gesture data" from the "attention seeking video source data" by a conventional gesture recognition technique. The partial conference video extracting unit 4 also extracts the "participant's standing-up image data" from the "attention seeking video source data". Likewise, the partial conference video extracting unit 4 extracts the "participant's mouse movement image data" from the "attention seeking video source data".

The index providing unit 5 determines the time duration of the "Attention Seeking" in the functional action layer by calculating the logical sum of the time durations of the actions in the media layer, as in the case of "Speaking" shown in FIG. 14. In a case where Alice tries to obtain the right to speak ("Attention Seeking") as a participant in the conference, the above described (a) "attention seeking video source data", (b) "Alice's attention seeking gesture (raising her hand) data", (c) "Alice's standing-up image data", (d) "Alice's mouse movement image data", and (e) "attention seeking voice data (Alice's uttering "excuse me")" are regarded as the data in the media layer relating to Alice. Also, the above described (f) "detected attention seeking time duration (period of time)" is regarded as the data in the functional action layer relating to Alice.

Figure 17:
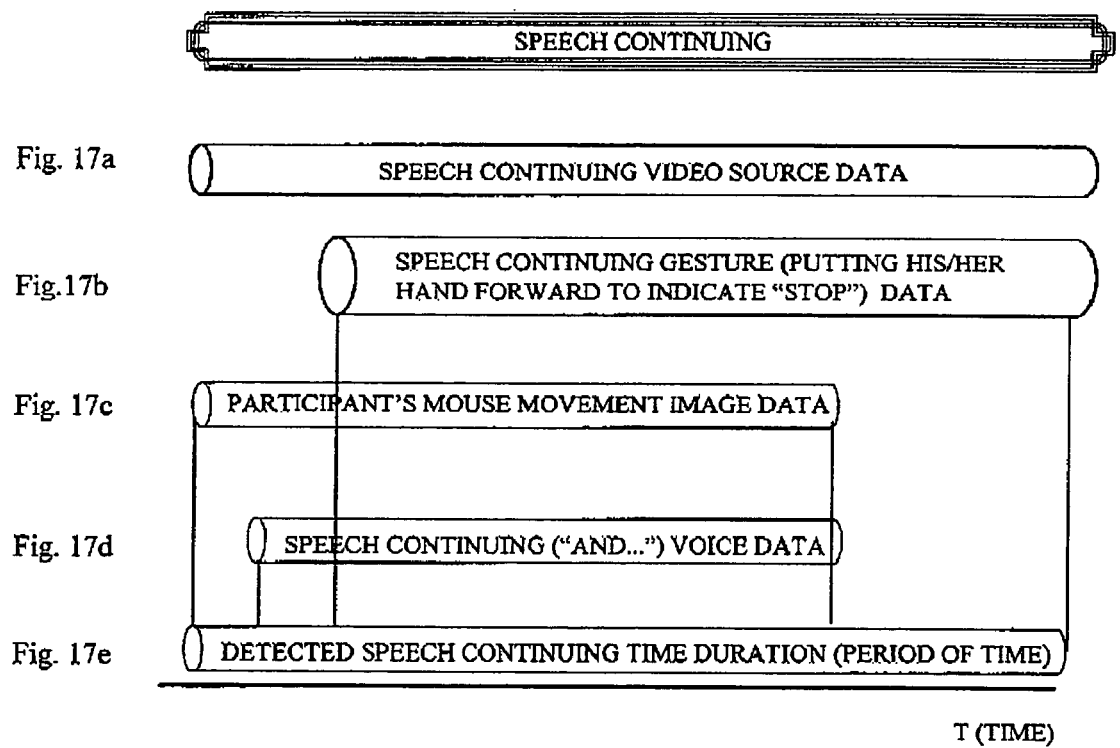
FIG. 17 is a time line chart of a functional action of "Speech Continuing"

Referring now to FIG. 17, a case of "Speech Continuing" will be described. FIG. 17 is a time line chart of a functional action of "Speech Continuing". The abscissa axis in FIG. 17 indicates time (elapsed time). This time line chart shows: (a) "speech continuing video source data", (b) "speech continuing gesture (putting his/her hand forward to indicate "stop") data", (c) "participant's mouse movement image data", and (d) "speech continuing ("and . . . ") voice data", which are regarded as data in the above described media layer. The time line chart also shows (e) "detected speech continuing time duration (period of time)", which is regarded as data in the functional action layer.

The "speech continuing video source data" in FIG. 17 are the motion image data of the speech continuing action, and serve as the data source for the "speech continuing gesture data" and the "participant's mouse movement image data". The partial conference video extracting unit 4 extracts the "speech continuing gesture data" from the "speech continuing video source data" by a conventional gesture recognition technique. Likewise, the partial conference video extracting unit 4 extracts the "participant's mouse movement image data" from the "speech continuing video source data". The index providing unit 5 determines the time duration of the "Speech Continuing" in the functional action layer by calculating the logical sum of the time durations of the actions in the media layer, as in the case of "Speaking" shown in FIG. 14.

In a case where Alice maintains the right to speak ("Speech Continuing") as a participant in the conference, the above described (a) "speech continuing video source data", (b) "Alice's speech continuing gesture (putting her hand forward) data", (c) "Alice's mouse movement image data", and (d) "speech continuing voice data (Alice's uttering "and . . . ")" are regarded as the data in the media layer relating to Alice. Also, the above described (e) "detected speech continuing time duration (period of time)" is regarded as the data in the functional action layer relating to Alice.

Referring now to FIG. 18, a case of "Observing" will be described. FIG. 18 is a time line chart of a functional action of "Observing". The abscissa axis in FIG. 18 indicates time (elapsed time). This time line chart shows: (a) "observing video source data" and (b) "observer's eye movement image data", which are regarded as data in the above described media layer. The time line chart also shows (c) "detected observing time duration (period of time)", which is regarded as data in the functional action layer. The "observing video source data" in FIG. 18 are the motion image-data of the observing action, and serve as the data source for the "observer's eye movement image data".

The partial conference video extracting unit 4 extracts the "observer's eye movement image data" from the "observing video source data" by a conventional eye movement following technique. The index providing unit 5 determines the time duration of the "Observing" in the functional action layer by calculating the logical sum of the time durations of the actions in the media layer, as in the case of "Speaking" shown in FIG. 14. To obtain eye movement data, the following techniques can be used: the techniques disclosed in "Application Inner Structure Visualizing Interface Utilizing Eye Movements" (Yamato, et al., IEICE Technical Report, HIP2000-12(2000-06), pp. 37-42) and "For Environments with Eyes: from Eye Interface to Eye Communication" (by Takehiko Ohno, IPSJ Technical Report, Vol. 2001, No. 87, Human Interface 95-24 (Sep. 14, 2001), pp. 171-178).

Figure 19:
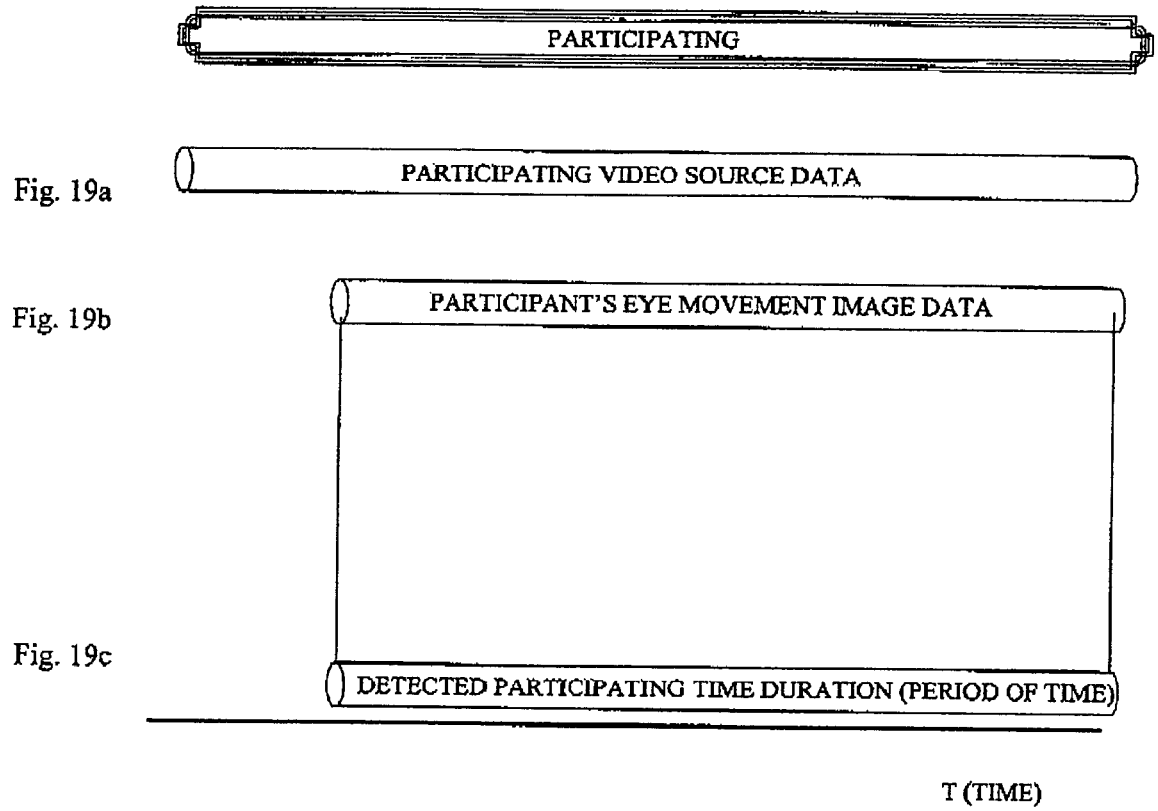
FIG. 19 is a time line chart of a functional action of "Participating"

Referring now to FIG. 19, a case of "Participating" will be described. FIG. 19 is a time line chart of a functional action of "Participating". The abscissa axis in FIG. 19 indicates time (elapsed time). This time line chart shows: (a) "participating video source data" and (b) "participant's eye movement image data", which are regarded as data in the above described media layer. The time line chart also shows (c) "detected participating time duration (period of time)", which is regarded as data in the functional action layer. The "participating video source data" in FIG. 19 are the motion image data of the participating action, and serve as the data source for the "participant's eye movement image data". The partial conference video extracting unit 4 extracts the "participant's eye movement image data" from the "participating video source data" by a conventional eye movement following technique. The index providing unit 5 determines the time duration of the "Participating" in the functional action layer by calculating the logical sum of the time durations of the actions in the media layer, as in the case of "Speaking" shown in FIG. 14.

Figure 20:
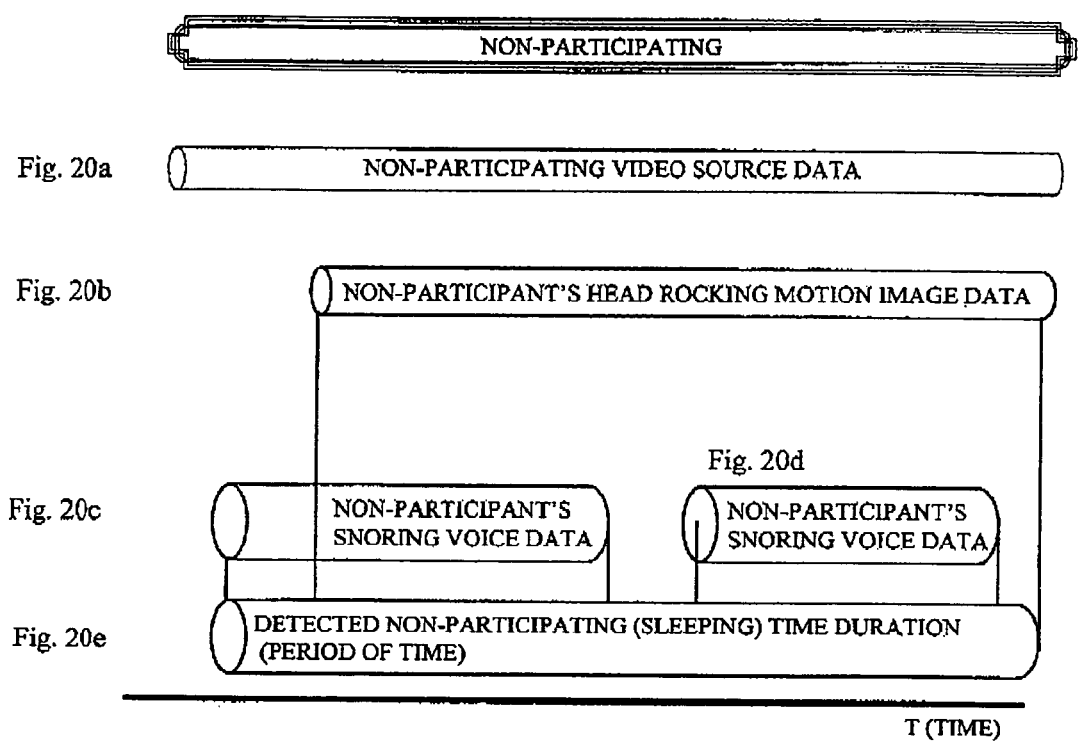
FIG. 20 is a time line chart of a functional action of "Non-Participating"

Referring now to FIG. 20, a case of "Non-Participating" will be described. FIG. 20 is a time line chart of a functional action of "Non-Participating". The abscissa axis in FIG. 20 indicates time (elapsed time). This time line chart shows: (a) "non-participating video source data", (b) "non-participant's head rocking motion image data", (c) "non-participant's snoring voice data", and (d) "non-participant's snoring voice data", which are regarded as data in the above described media layer. The time line chart also shows (e) "detected non-participating time duration (period of time)", which is regarded as data in the functional action layer.

The "non-participating video source data" in FIG. 20 are the motion image data of the non-participating action, and serve as the data source for the "non-participant's head rocking motion image data". The partial conference video extracting unit 4 extracts the "non-participant's head rocking motion image data" from the "non-participating video source data" by a conventional gesture recognition technique. The index providing unit 5 determines the time duration of the "Non-Participating" in the functional action layer by calculating the logical sum of the time durations of the actions in the media layer, as in the case of "Speaking" shown in FIG. 14.

Figure 21:
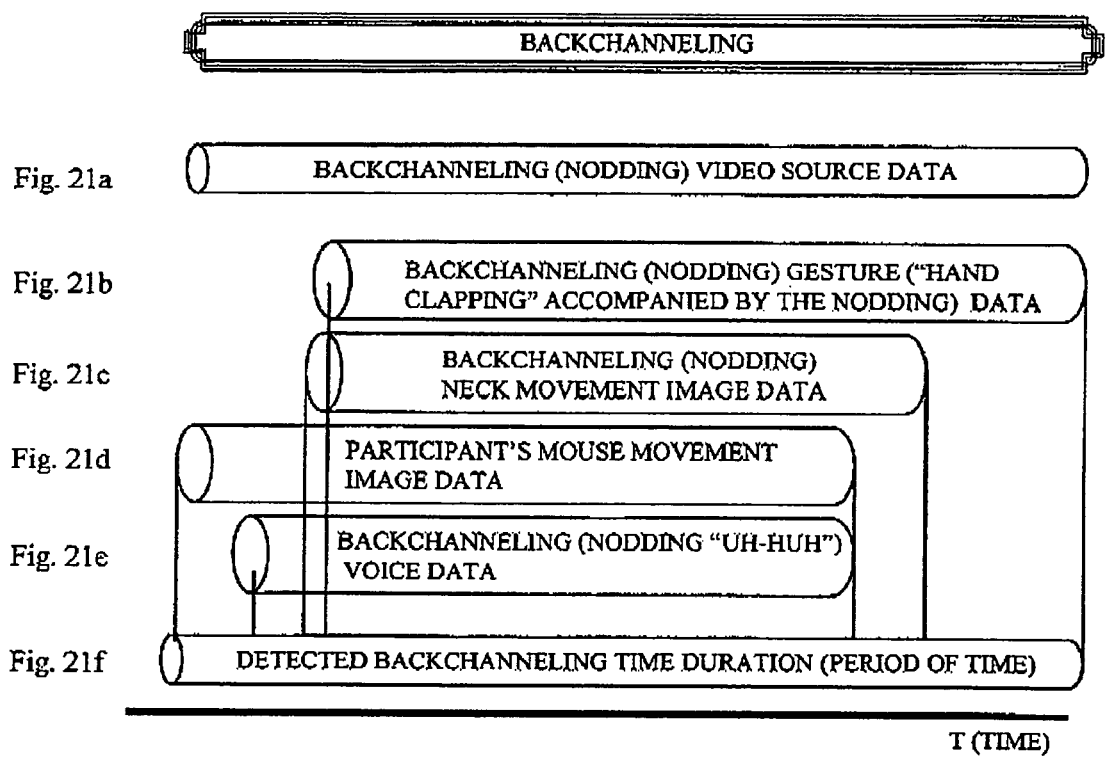
FIG. 21 is a time line chart of a functional action of "Back-channeling"

Referring now to FIG. 21, a case of "Backchanneling" will be described. FIG. 21 is a time line chart of a functional action of "Backchanneling". The abscissa axis in FIG. 21 indicates time (elapsed time). This time line chart shows: (a) "backchanneling (nodding) video source data", (b) "backchanneling gesture ("hand clapping" accompanied by nodding) data", (c) "backchanneling (nodding) neck movement image data", (d) "participant's mouse movement image data", and (e) "backchanneling ("uh-huh") voice data", which are regarded as data in the above described media layer. The time line chart also shows (f) "detected backchanneling time duration (period of time)", which is regarded as data in the functional action layer.

The "backchanneling video source data" in FIG. 21 are the motion image data of the backchanneling action, and serve as the data source for the "backchanneling gesture data", the "backchanneling neck movement image data", and the "participant's mouse movement image data". The partial conference video extracting unit 4 extracts the "backchanneling gesture data" from the "backchanneling video source data" by a conventional gesture recognition technique. The partial conference video extracting unit 4 also extracts the "backchanneling neck movement image data" from the backchanneling video source data". Likewise, the partial conference video extracting unit 4 extracts the "participant's mouse movement image data" from the "backchanneling video source data". The index providing unit 5 determines the time duration of the "Backchanneling" in the functional action layer by calculating the logical sum of the time durations of the actions in the media layer, as in the case of "Speaking" shown in FIG. 14.

In a case where Alice makes a response (backchannels) as a participant in the conference, the above described (a) "backchanneling video source data", (b) "Alice's backchanneling gesture (clapping her hands) data", (c) "Alice's nodding (neck movement) image data", (d) "Alice's mouse movement image data", and (e) "backchanneling voice data (Alice's uttering "uh-huh")" are regarded as the data in the media layer relating to Alice. Also, the above described (f) "detected backchanneling time duration (period of time)" is regarded as the data in the functional action layer relating to Alice.

To determine the time duration of the nodding (neck movement) image data, the technique disclosed in "Analysis of Gesture Interrelationship in Natural Conversations" (Maeda, et al., IPSJ Technical Report, Vol. 2003, No. 9, Human Interface 102-7(Jan. 31, 2003), pp. 39-46) can be used. To detect the location of the head and the posture of a participant, the technique disclosed in "Method of Detecting Head Location and Posture, and Applications of the Method for Large-Sized Information Presenting Environments" (Fujii, et al., IPSJ Technical Report, Vol. 2002, No. 38, Human Interface 98-6 (May 17, 2002), pp. 33-40) can be used. To detect neck movements, the technique disclosed in "Study on Neck-Movement PC Operation Support Tools for the Handicapped" (Kubo, et al., IEICE Technical Report, HCS2000-5 (2000-04), pp. 29-36) can be used.

Figure 22:
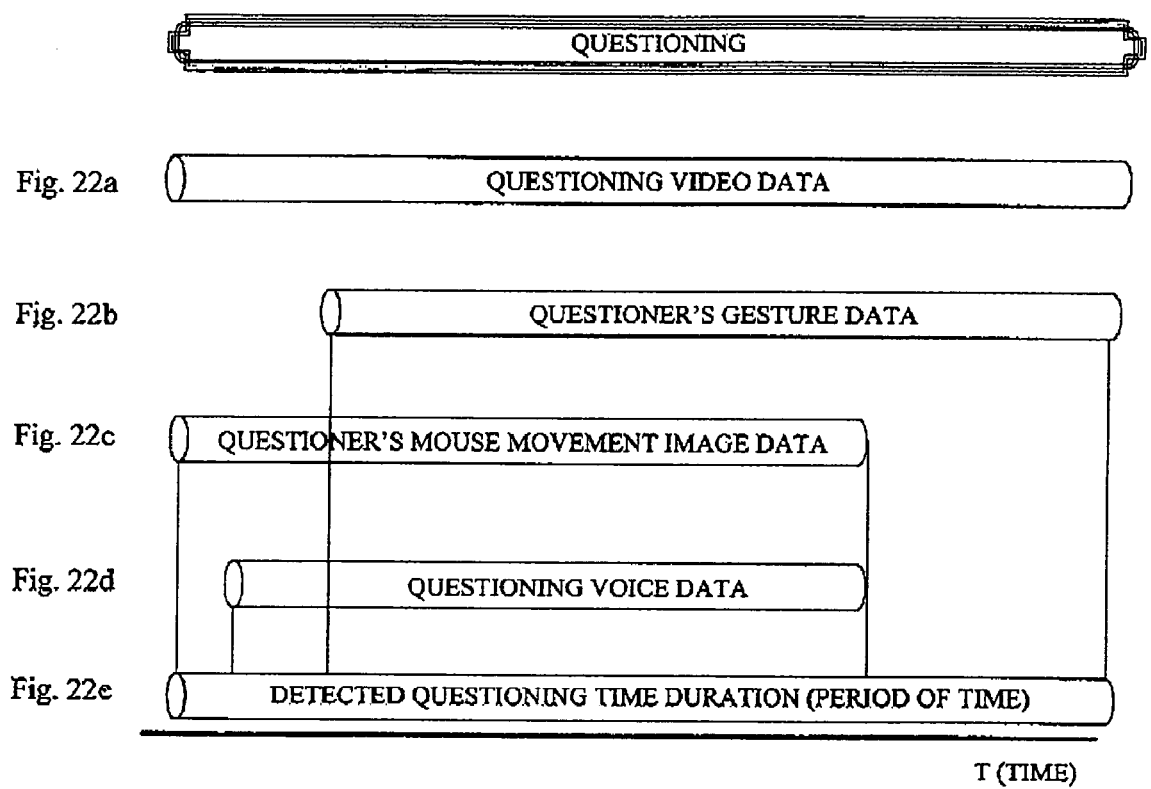
FIG. 22 is a time line chart of a functional action of "Questioning"

Referring now to FIG. 22, a case of "Questioning" will be described. FIG. 22 is a time line chart of a functional action of "Questioning". The abscissa axis in FIG. 22 indicates time (elapsed time). This time line chart shows: (a) "questioning video source data", (b) "questioning gesture (raising his/her hand) data", (c) "questioner's mouse movement image data", and (d) "questioning voice data", which are regarded as data in the above described media layer. The time line chart also shows (e) "detected questioning time duration (period of time)", which is regarded as data in the functional action layer. The "questioning video source data" in FIG. 22 are the motion image data of the questioning action, and serve as the data source for the "questioning gesture data" and the "questioner's mouse movement image data".

The partial conference video extracting unit 4 extracts the "questioning gesture data" from the "questioning video source data" by a conventional gesture recognition technique. Likewise, the partial conference video extracting unit 4 extracts the "participant's mouse movement image data" from the "questioning video source data". The index providing unit 5 determines the time duration of the "Questioning" in the functional action layer by calculating the logical sum of the time durations of the actions in the media layer, as in the case of "Speaking" shown in FIG. 14.

In a case where Alice asks a question as a participant in the conference, the above described (a) "questioning video source data", (b) "Alice's questioning gesture (raising her hands) data", (c) "Alice's mouse movement image data", and (d) "Alice's questioning voice data" are regarded as the data in the media layer relating to Alice. Also, the above described (e) "detected questioning time duration (period of time)" is regarded as the data in the functional action layer relating to Alice.

Figure 23:
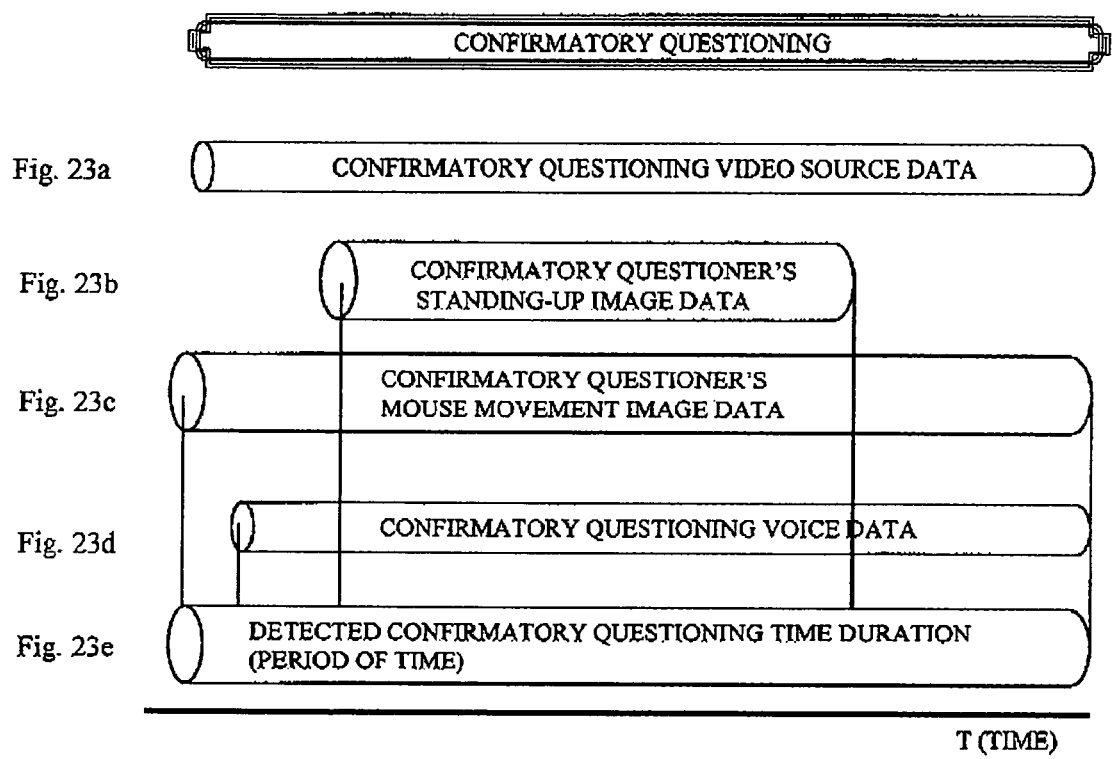
FIG. 23 is a time line chart of a functional action of "Confirmatory Questioning"

Referring now to FIG. 23, a case of "Confirmatory Questioning" will be described. FIG. 23 is a time line chart of a functional action of "Confirmatory Questioning". The abscissa axis in FIG. 23 indicates time (elapsed time). This time line chart shows: (a) "confirmatory questioning video source data", (b) "confirmatory questioner's standing-up image data", (c) "confirmatory questioner's mouse movement image data", and (d) "confirmatory questioning voice data", which are regarded as data in the above described media layer. The time line chart also shows (e) "detected confirmatory questioning time duration (period of time)", which is regarded as data in the functional action layer.

The "confirmatory questioning video source data" in FIG. 23 are the motion image data of the confirmatory questioning action, and serve as the data source for the "confirmatory questioner's standing-up image data" and the "confirmatory questioner's mouse movement image data". The partial conference video extracting unit 4 extracts the "confirmatory questioner's standing-up image data" from the "confirmatory questioning video source data" by a conventional gesture recognition technique. Likewise, the partial conference video extracting unit 4 extracts the "confirmatory questioner's mouse movement image data" from the "confirmatory questioning video source data". The index providing unit 5 determines the time duration of the "Confirmatory Questioning" in the functional action layer by calculating the logical sum of the time durations of the actions in the media layer, as in the case of "Speaking" shown in FIG. 14.

In a case where Alice asks a confirmatory question as a participant in the conference, the above described (a) "confirmatory questioning video source data", (b) "Alice's standing-up image data", (c) "Alice's mouse movement image data", and (d) "Alice's confirmatory questioning voice data" are regarded as the data in the media layer relating to Alice. Also, the above described (e) "detected confirmatory questioning time duration (period of time)" is regarded as the data in the functional action layer relating to Alice.

Figure 24:
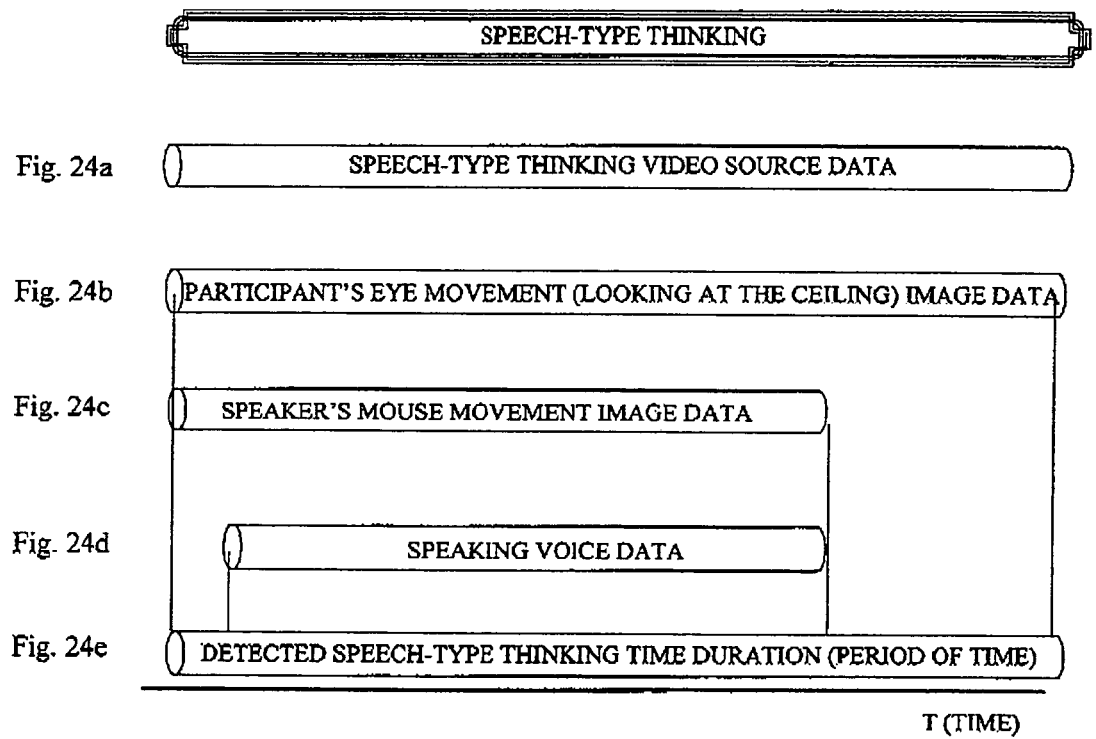
FIG. 24 is a time line chart of a functional action of "Speech-Type Thinking"

Referring now to FIG. 24, a case of "Speech-Type Thinking" will be described. FIG. 24 is a time line chart of a functional action of "Speech-Type Thinking". The abscissa axis in FIG. 24 indicates time (elapsed time). This time line chart shows: (a) "speech-type thinking video source data", (b) "participant's eye movement (looking at the ceiling) image data", (c) "speaker's mouse movement image data", and (d) "speaking voice data", which are regarded as data in the above described media layer. The time line chart also shows (e) "detected speech-type thinking time duration (period of time)", which is regarded as data in the functional action layer. The "speech-type thinking video source data" in FIG. 24 are the motion image data of the speech-type thinking action, and serve as the data source for the "participant's eye movement (looking at the ceiling) image data" and the "speaker's mouse movement image data".

The partial conference video extracting unit 4 extracts the "participant's eye movement (looking at the ceiling) image data" from the "speech-type thinking video source data" by a conventional eye movement measuring technique and a conventional gesture recognition technique. Likewise, the partial conference video extracting unit 4 extracts the "speaker's mouse movement image data" from the "speech-type thinking video source data". The index providing unit 5 determines the time duration of the "Speech-Type Thinking" in the functional action layer by calculating the logical sum of the time durations of the actions in the media layer, as in the case of "Speaking" shown in FIG. 14.

In a case where Alice performs "Speech-Type Thinking" as a participant in the conference, the above described (a) "speech-type thinking video source data", (b) "Alice's eye movement (looking at the ceiling) image data", (c) "Alice's mouse movement image data", and (d) "Alice's speaking voice data" are regarded as the data in the media layer relating to Alice. Also, the above described (e) "detected speech-type thinking time duration (period of time)" is regarded as the data in the functional action layer relating to Alice.

Figure 25:
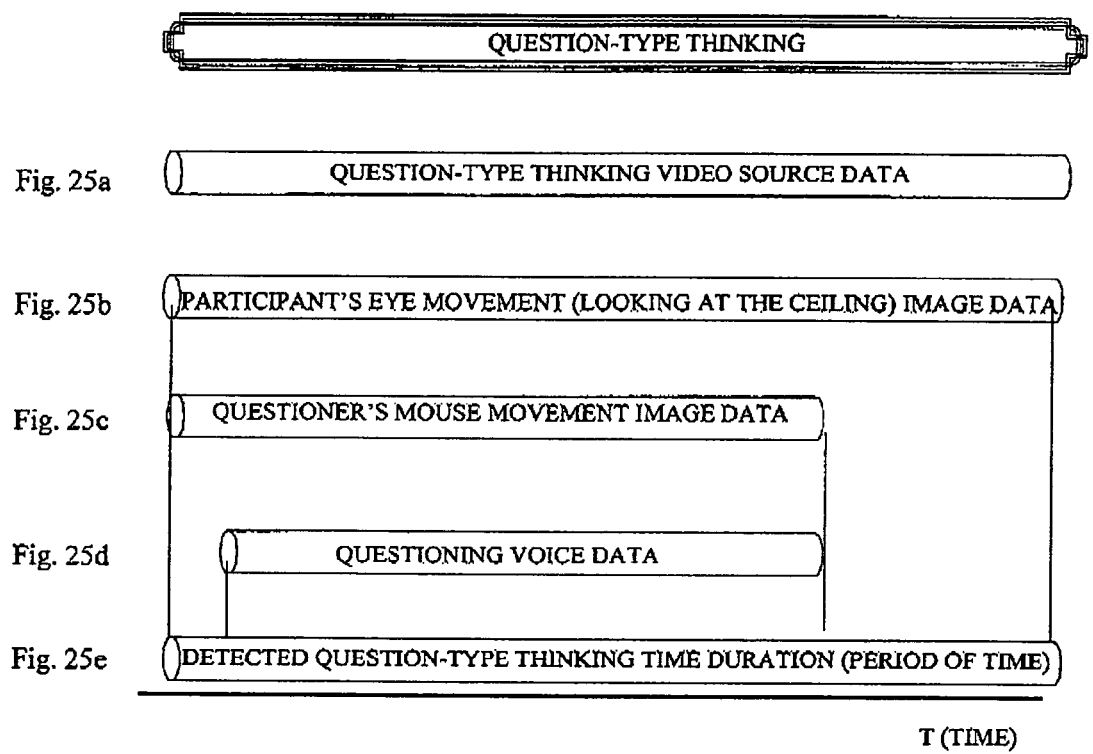
FIG. 25 is a time line chart of a functional action of "Question-Type Thinking"

Referring now to FIG. 25, a case of "Question-Type Thinking" will be described. FIG. 25 is a time line chart of a functional action of "Question-Type Thinking". The abscissa axis in FIG. 25 indicates time (elapsed time). This time line chart shows: (a) "question-type thinking video source data", (b) "participant's eye movement (looking at the ceiling) image data", (c) "questioner's mouse movement image data", and (d) "questioning voice data", which are regarded as data in the above described media layer. The time line chart also shows (e) "detected question-type thinking time duration (period of time)", which is regarded as data in the functional action layer. The "question-type thinking video source data"

in FIG. 25 are the motion image data of the question-type thinking action, and serve as the data source for the "participant's eye movement (looking at the ceiling) image data" and the "questioner's mouse movement image data".

The partial conference video extracting unit 4 extracts the "participant's eye movement (looking at the ceiling) image data" from the "question-type thinking video source data" by a conventional eye movement measuring technique and a conventional gesture recognition technique. Likewise, the partial conference video extracting unit 4 extracts the "questioner's mouse movement image data" from the "question-type thinking video source data". The index providing unit 5 determines the time duration of the "Question-Type Thinking" in the functional action layer by calculating the logical sum of the time durations of the actions in the media layer, as in the case of "Speaking" shown in FIG. 14.

In a case where Alice performs "Question-Type Thinking" as a participant in the conference, the above described (a) "question-type thinking video source data", (b) "Alice's eye movement (looking at the ceiling) image data", (c) "Alice's mouse movement image data", and (d) "Alice's questioning voice data" are regarded as the data in the media layer relating to Alice. Also, the above described (e) "detected question-type thinking time duration (period of time)" is regarded as the data in the functional action layer relating to Alice.

Figure 26:
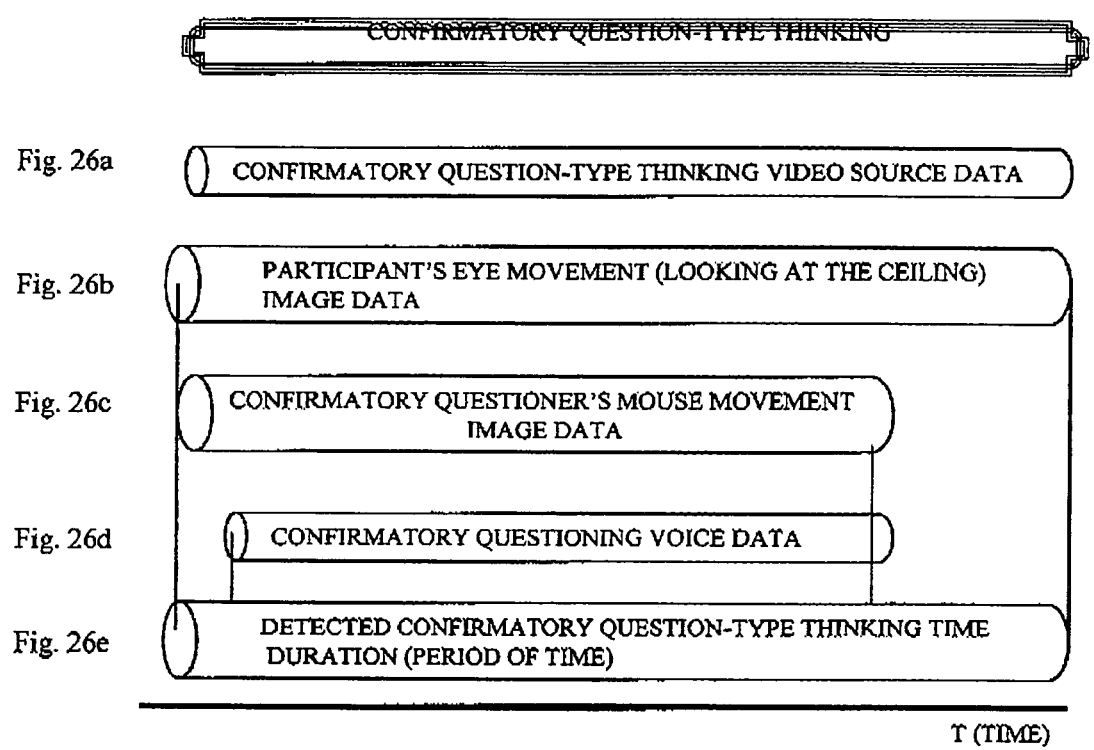
FIG. 26 is a time line chart of a functional action of "Confirmatory Question-Type Thinking"

Referring now to FIG. 26, a case of "Confirmatory Question-Type Thinking" will be described. FIG. 26 is a time line chart of a functional action of "Confirmatory Question-Type Thinking". The abscissa axis in FIG. 26 indicates time (elapsed time). This time line chart shows: (a) "confirmatory question-type thinking video source data", (b) "participant's eye movement (looking at the ceiling) image data", (c) "confirmatory questioner's mouse movement image data", and (d) "confirmatory questioning voice data", which are regarded as data in the above described media layer. The time line chart also shows (e) "detected confirmatory question-type thinking time duration (period of time)", which is regarded as data in the functional action layer.

The "confirmatory question-type thinking video source data" in FIG. 26 are the motion image data of the confirmatory question-type thinking action, and serve as the data source for the "participant's eye movement (looking at the ceiling) image data" and the "confirmatory questioner's mouse movement image data". The partial conference video extracting unit 4 extracts the "participant's eye movement (looking at the ceiling) image data" from the "confirmatory question-type thinking video source data" by a conventional eye movement measuring technique and a conventional gesture recognition technique. Likewise, the partial conference video extracting unit 4 extracts the "confirmatory questioner's mouse movement image data" from the "confirmatory question-type thinking video source data". The index providing unit 5 determines the time duration of the "Confirmatory Question-Type Thinking" in the functional action layer by calculating the logical sum of the time durations of the actions in the media layer, as in the case of "Speaking" shown in FIG. 14.

In a case where Alice performs "Confirmatory Question-Type Thinking" as a participant in the conference, the above described (a) "confirmatory question-type thinking video source data", (b) "Alice's eye movement (looking at the ceiling) image data", (c) "Alice's mouse movement image data", and (d) "Alice's confirmatory questioning voice data" are regarded as the data in the media layer relating to Alice. Also, the above described (e) "detected confirmatory question-type thinking time duration (period of time)" is regarded as the data in the functional action layer relating to Alice.

Figure 27:
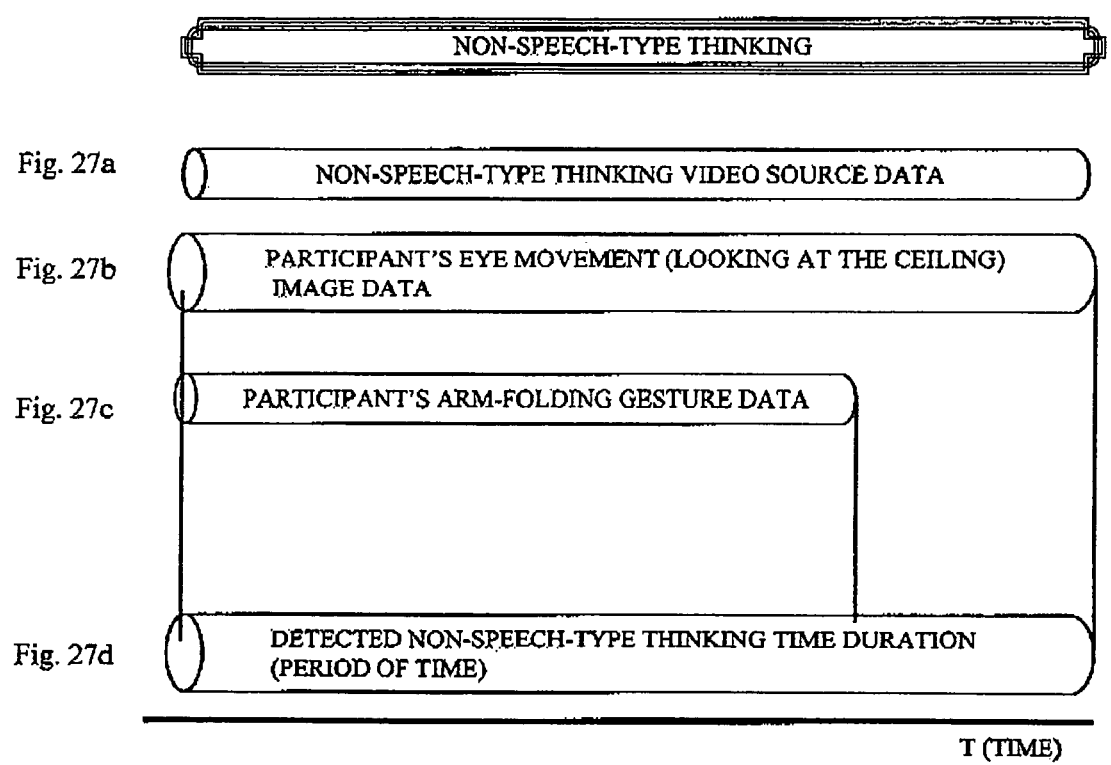
FIG. 27 is a time line chart of a functional action of "Non-Speech-Type Thinking"

Referring now to FIG. 27, a case of "Non-Speech-Type Thinking" will be described. FIG. 27 is a time line chart of a functional action of "Non-Speech-Type Thinking". The abscissa axis in FIG. 27 indicates time (elapsed time). This time line chart shows: (a) "non-speech-type thinking video source data", (b) "participant's eye movement (looking at the ceiling) image data", and (c) "participant's arm-folding gesture data", which are regarded as data in the above described media layer. The time line chart also shows (e) "detected non-speech-type thinking time duration (period of time)", which is regarded as data in the functional action layer.

The "non-speech-type thinking video source data" in FIG. 27 are the motion image data of the non-speech-type thinking action, and serve as the data source for the "participant's eye movement (looking at the ceiling) image data" and the "participant's arm-folding gesture data". The partial conference video extracting unit 4 extracts the "participant's eye movement (looking at the ceiling) image data" from the "non-speech-type thinking video source data" by a conventional eye movement measuring technique and a conventional gesture recognition technique. Likewise, the partial conference video extracting unit 4 extracts the "participant's arm-folding gesture data" from the "non-speech-type thinking video source data". The index providing unit 5 determines the time duration of the "Non-Speech-Type Thinking" in the functional action layer by calculating the logical sum of the time durations of the actions in the media layer, as in the case of "Speaking" shown in FIG. 14.

In a case where Alice performs "Non-Speech-Type Thinking" as a participant in the conference, the above described (a) "non-speech-type thinking video source data", (b) "Alice's eye movement (looking at the ceiling) image data", and (c) "Alice's arm-folding gesture data" are regarded as the data in the media layer relating to Alice. Also, the above described (d) "detected non-speech-type thinking time duration (period of time)" is regarded as the data in the functional action layer relating to Alice.

Referring now to FIG. 28, a case of "Talking-to-Oneself" will be described. FIG. 28 is a time line chart of a functional action of "Talking-to-Oneself", The abscissa axis in FIG. 28 indicates time (elapsed time). This time line chart shows: (a) "talking-to-oneself video source data", (b) "participant's mouse movement image data", and (c) "talking-to-oneself voice data", which are regarded as data in the above described media layer. The time line chart also shows (d) "detected talking-to-oneself time duration (period of time)", which is regarded as data in the functional action layer. The "talking-to-oneself video source data" in FIG. 28 are the motion image data of the talking-to-oneself action, and serve as the data source for the "participant's mouse movement image data".

The partial conference video extracting unit 4 extracts the "participant's mouse movement image data" from the "talking-to-oneself video source data" by a conventional gesture recognition technique. The index providing unit 5 determines the time duration of the "Talking-to-Oneself" in the functional action layer by calculating the logical sum of the time durations of the actions in the media layer, as in the case of "Speaking" shown in FIG. 14.

In a case where Alice talks to herself while participating in the conference, the above described (a) "Alice's video source data", (b) "Alice's mouse movement image data", and (c) "Alice's talking-to-herself voice data" are regarded as the data in the media layer relating to Alice. Also, the above described (d) "detected talking-to-herself time duration (period of time)" is regarded as the data in the functional action layer relating to Alice.

Figure 29:
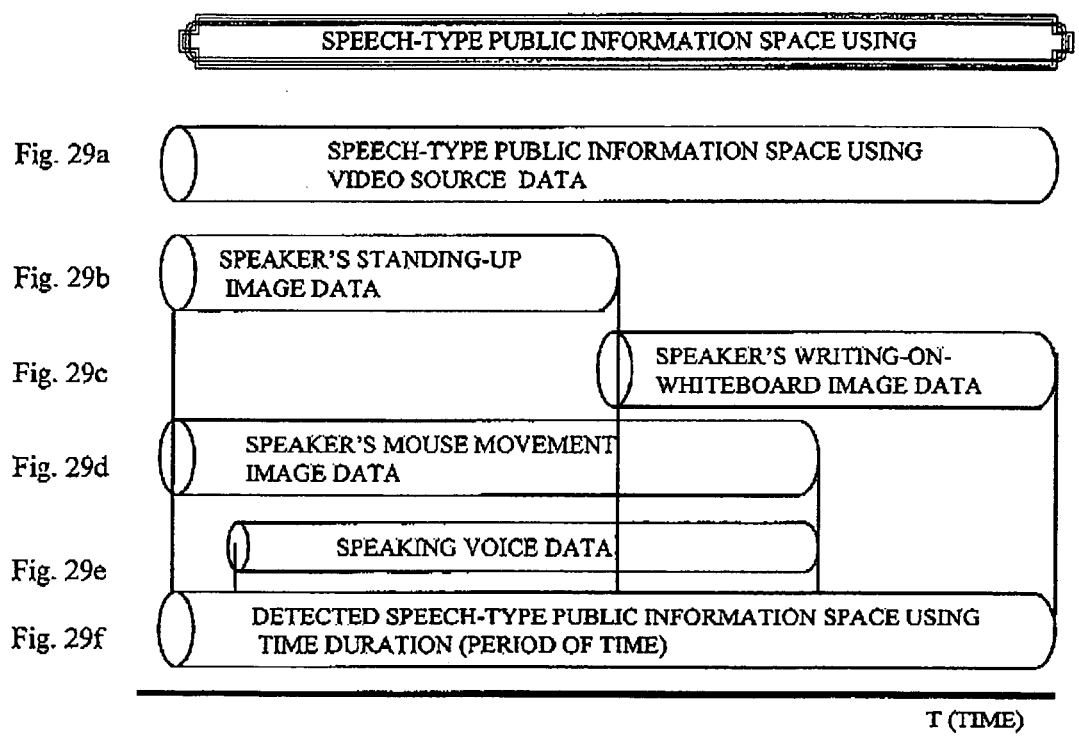
FIG. 29 is a time line chart of a functional action of "Speech-Type Public Information Space Using"

Referring now to FIG. 29, a case of "Speech-Type Public Information Space Using" will be described. FIG. 29 is a time line chart of a functional action of "Speech-Type Public Information Space Using". The abscissa axis in FIG. 29 indicates time (elapsed time). This time line chart shows: (a) "speech-type public information space using video source data", (b) "participant's standing-up image data", (C) "speaker's writing-on-whiteboard image data", (d) "speaker's mouse movement image data", and (e) "speaking voice data", which are regarded as data in the above described media layer. The time line chart also shows (f) "detected speech-type public information space using time duration (period of time)", which is regarded as data in the functional action layer.

The "speech-type public information space using video source data" in FIG. 29 are the motion image data of the speech-type public information space using action, and serve as the data source for the "speaker's standing-up image data", the "speaker's writing-on-whiteboard image data", and the "speaker's mouse movement image data". The partial conference video extracting unit 4 extracts the "speaker's standing-up image data" from the "speech-type public information space using video source data" by a conventional gesture recognition technique.

The partial conference video extracting unit 4 also extracts the "speaker's writing-on-whiteboard image data" from the "speech-type public information space using video source data". Likewise, the partial conference video extracting unit 4 extracts the "speaker's mouse movement image data" from the "speech-type public information space using video source data". The index providing unit 5 determines the time duration of the "Speech-Type Public Information Space Using" in the functional action layer by calculating the logical sum of the time durations of the actions in the media layer, as in the case of "Speaking" shown in FIG. 14.

In a case where Alice performs "Speech-Type Public Information Space Using" as a participant in the conference, the above described (a) "speech-type public information space using video source data", (b) "Alice's standing-up image data", (c) "Alice's writing-on-whiteboard image data", (d) "Alice's mouse movement image data", and (e) "Alice's speaking voice data" are regarded as the data in the media layer relating to Alice. Also, the above described (f) "detected speech-type public information space using time duration (period of time)" is regarded as the data in the functional action layer relating to Alice.

Figure 30:
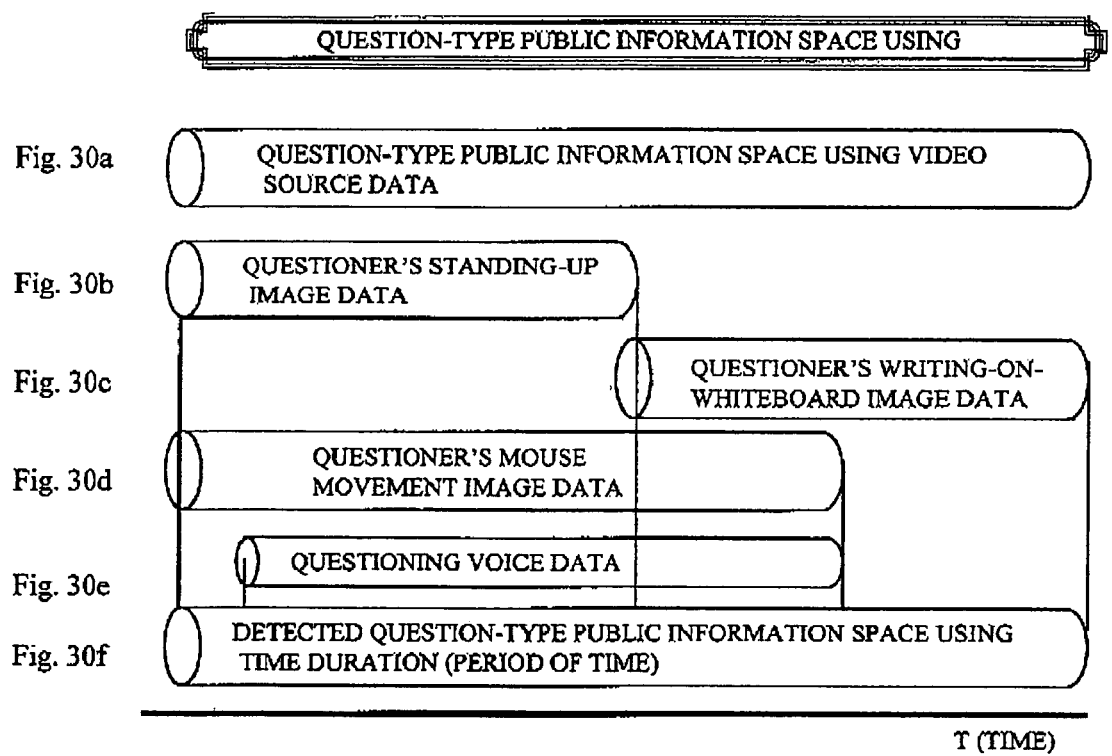
FIG. 30 is a time line chart of a functional action of "Question-Type Public Information Space Using"

Referring now to FIG. 30, a case of "Question-Type Public Information Space Using" will be described. FIG. 30 is a time line chart of a functional action of "Question-Type Public Information Space Using". The abscissa axis in FIG. 30 indicates time (elapsed time). This time line chart shows: (a) "question-type public information space using video source data", (b) "questioner's standing-up image data", (c) "questioner's writing-on-whiteboard image data", (d) "questioner's mouse movement image data", and (e) "questioning voice data", which are regarded as data in the above described media layer. The time line chart also shows (f) "detected question-type public information space using time duration (period of time)", which is regarded as data in the functional action layer.

The "question-type public information space using video source data" in FIG. 30 are the motion image data of the question-type public information space using action, and serve as the data source for the "questioner's standing-up image data", the "questioner's writing-on-whiteboard image data", and the "questioner's mouse movement image data". The partial conference video extracting unit 4 extracts the "questioner's standing-up image data" from the "question-type public information space using video source data" by a conventional gesture recognition technique. The partial conference video extracting unit 4 also extracts the "questioner's writing-on-whiteboard image data" from the "question-type public information space using video source data". Likewise, the partial conference video extracting unit 4 extracts the "questioner's mouse movement image data" from the "question-type public information space using video source data".

The index providing unit 5 determines the time duration of the "Question-Type Public Information Space Using" in the functional action layer by calculating the logical sum of the time durations of the actions in the media layer, as in the case of "Speaking" shown in FIG. 14. In a case where Alice performs "Question-Type Public Information Space Using" as a participant in the conference, the above described (a) "question-type public information space using video source data", (b) "Alice's standing-up image data", (c) "Alice's writing-on-whiteboard image data", (d) "Alice's mouse movement image data", and (e) "Alice's questioning voice data" are regarded as the data in the media layer relating to Alice. Also, the above described (f) "detected question-type public information space using time duration (period of time)" is regarded as the data in the functional action layer relating to Alice.

Figure 31:
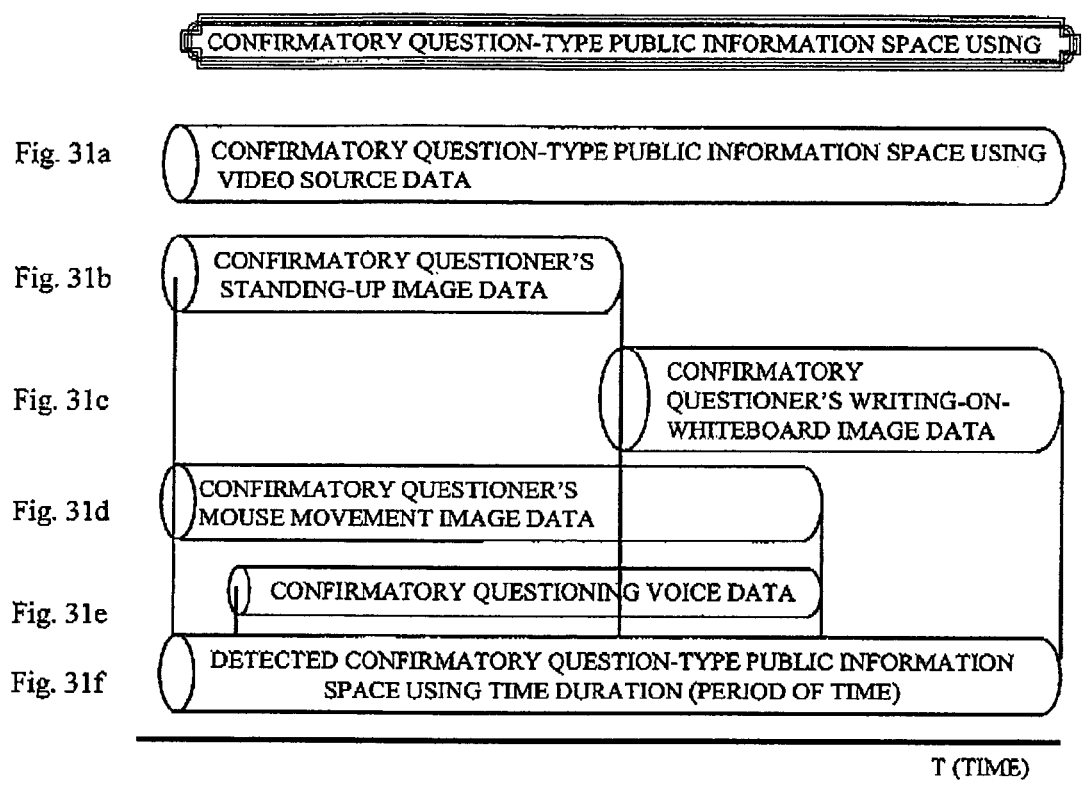
FIG. 31 is a time line chart of a functional action of "Confirmatory Question-Type Public Information Space Using"

Referring now to FIG. 31, a case of "Confirmatory Question-Type Public Information Space Using" will be described. FIG. 31 is a time line chart of a functional action of "Confirmatory Question-Type Public Information Space Using". The abscissa axis in FIG. 31 indicates time (elapsed time). This time line chart shows: (a) "confirmatory question-type public information space using video source data", (b) "confirmatory questioner's standing-up image data", (c) "confirmatory questioner's writing-on-whiteboard image data", (d) "confirmatory questioner's mouse movement image data", and (e) "confirmatory questioning voice data", which are regarded as data in the above described media layer. The time line chart also shows (f) "detected confirmatory question-type public information space using time duration (period of time)", which is regarded as data in the functional action layer.

The "confirmatory question-type public information space using video source data" in FIG. 31 are the motion image data of the confirmatory question-type public information space using action, and serve as the data source for the "confirmatory questioner's standing-up image data", the "confirmatory questioner's writing-on-whiteboard image data", and the "confirmatory questioner's mouse movement image data". The partial conference video extracting unit 4 extracts the "confirmatory questioner's standing-up image data" from the "confirmatory question-type public information space using video source data" by a conventional gesture recognition technique.

The partial conference video extracting unit 4 also extracts the "confirmatory questioner's writing-on-whiteboard image data" from the "confirmatory question-type public information space using video source data". Likewise, the partial conference video extracting unit 4 extracts the "confirmatory questioner's mouse movement image data" from the "confirmatory question-type public information space using video source data". The index providing unit 5 determines the time duration of the "Confirmatory Question-Type Public Information Space Using" in the functional action layer by calculating the logical sum of the time durations of the actions in the media layer, as in the case of "Speaking" shown in FIG. 14.

In a case where Alice performs "Confirmatory Question-Type Public Information Space Using" as a participant in the conference, the above described (a) "confirmatory question-type public information space using video source data", (b) "Alice's standing-up image data", (c) "Alice's writing-on-whiteboard image data", (d) "Alice's mouse movement image data", and (e) "Alice's confirmatory questioning voice data" are regarded as the data in the media layer relating to Alice. Also, the above described (f) "detected confirmatory question-type public information space using time duration (period of time)" is regarded as the data in the functional action layer relating to Alice.

Figure 32:
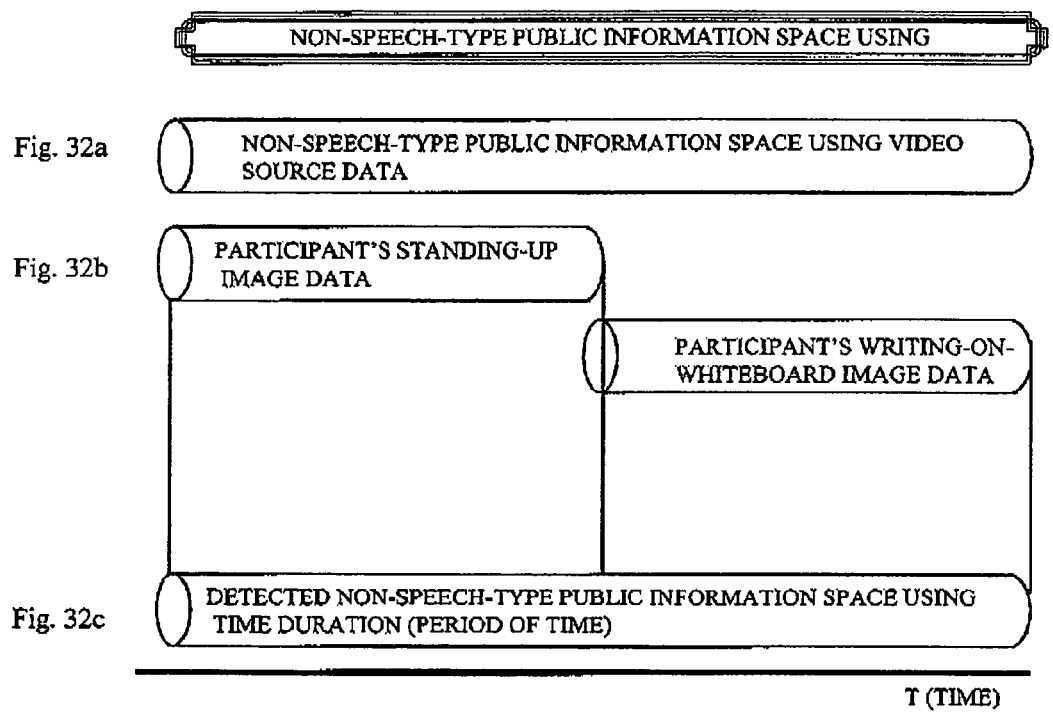
FIG. 32 is a time line chart of a functional action of "Non-Speech-Type Public Information Space Using"

Referring now to FIG. 32, a case of "Non-Speech-Type Public Information Space Using" will be described. FIG. 32 is a time line chart of a functional action of "Non-Speech-Type Public Information Space Using". The abscissa axis in FIG. 32 indicates time (elapsed time). This time line chart shows: (a) "non-speech-type public information space using video source data", (b) "participant's standing-up image data", and (c) "participant's writing-on-whiteboard image data", which are regarded as data in the above described media layer. The time line chart also shows (d) "detected non-speech-type public information space using time duration (period of time)", which is regarded as data in the functional action layer.

The "non-speech-type public information space using video source data" in FIG. 32 are the motion image data of the non-speech-type public information space using action, and serve as the data source for the "participant's standing-up image data" and the "participant's writing-on-whiteboard image data". The partial conference video extracting unit 4 extracts the "participant's standing-up image data" from the "non-speech-type public information space using video source data" by a conventional gesture recognition technique. Likewise, the partial conference video extracting unit 4 extracts the "participant's writing-on-whiteboard image data" from the "non-speech-type public information space using video source data". The index providing unit 5 determines the time duration of the "Non-Speech-Type Public Information Space Using" in the functional action layer by calculating the logical sum of the time durations of the actions in the media layer, as in the case of "Speaking" shown in FIG. 14.

In a case where Alice performs "Non-Speech-Type Public Information Space Using" as a participant in the conference, the above described (a) "non-speech-type public information space using video source data", (b) "Alice's standing-up image data", and (c) "Alice's writing-on-whiteboard image data" are regarded as the data in the media layer relating to Alice. Also, the above described (d) "detected non-speech-type public information space using time duration (period of time)" is regarded as the data in the functional action layer relating to Alice.

Figure 33:
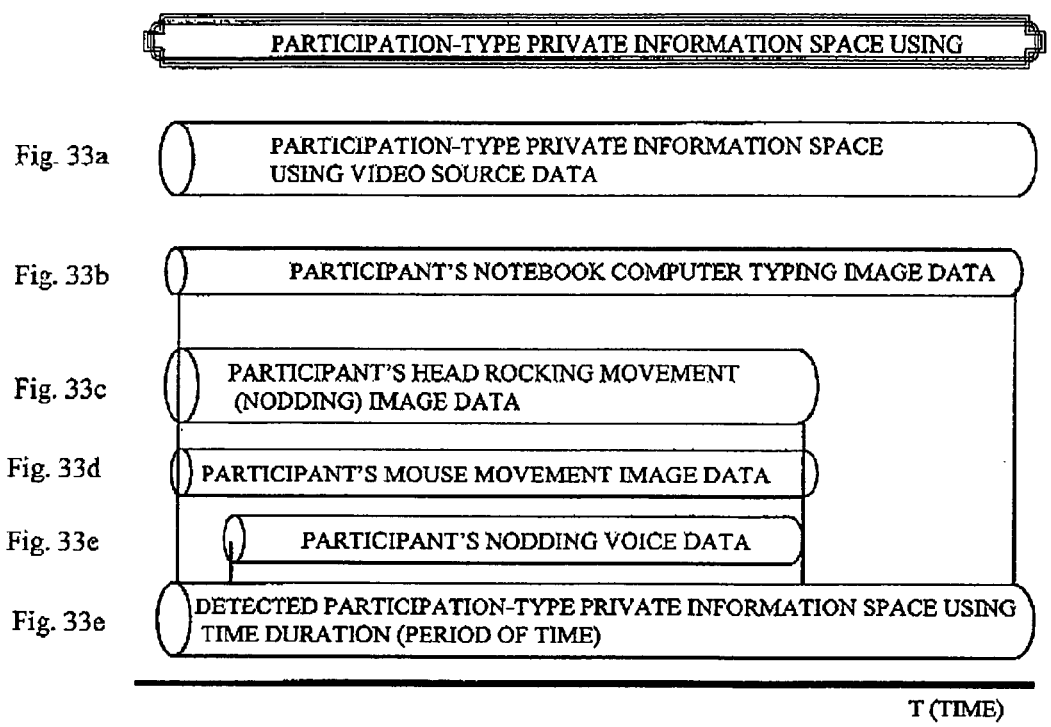
FIG. 33 is a time line chart of a functional action of "Participation-Type Private Information Space Using"

Referring now to FIG. 33, a case of "Participation-Type Private Information Space Using" will be described. FIG. 33 is a time line chart of a functional action of "Participation-Type Private Information Space using". The abscissa axis in FIG. 33 indicates time (elapsed time) This time line chart shows: (a) "participation-type private information space using video source data", (b) "participant's notebook computer typing image data", (c) "participant's head rocking movement (nodding) image data", (d) "participant's mouse movement image data", and (e) "participant's nodding voice data", which are regarded as data in the above described media layer. The time line chart also shows (f) "detected participation-type private information space using time duration (period of time)", which is regarded as data in the functional action layer.

The "participation-type private information space using video source data" in FIG. 33 are the motion image data of the participation-type private information space using action, and serve as the data source for the "participant's notebook computer typing image data", the "participant's head rocking movement (nodding) image data", and the "participant's mouse movement image data". The partial conference video extracting unit 4 extracts the "participant's notebook computer typing image data" from the "participant-type private information space using video source data" by a conventional gesture recognition technique.

The partial conference video extracting unit 4 also extracts the "participant's head rocking movement (nodding) image data" from the "participant-type private information space using video source data". Likewise, the partial conference video extracting unit 4 extracts the "participant's mouse movement image data" from the "participation-type private information space using video source data". The index providing unit 5 determines the time duration of the "Participation-Type Private Information Space Using" in the functional action layer by calculating the logical sum of the time durations of the actions in the media layer, as in the case of "Speaking" shown in FIG. 14.

In a case where Alice performs "Participation-Type Private Information Space Using" as a participant in the conference, the above described (a) "participation-type private information space using video source data", (b) "Alice's notebook computer typing image data", (c) "Alice's head rocking movement (nodding) image data", (d) "Alice's mouse movement image data", and (e) "Alice's agreeing voice data (such as "uh-huh" and "I see")" are regarded as the data in the media layer relating to Alice. Also, the above described (f) "detected participation-type private information space using time duration (period of time)" is regarded as the data in the functional action layer relating to Alice.

Figure 34:
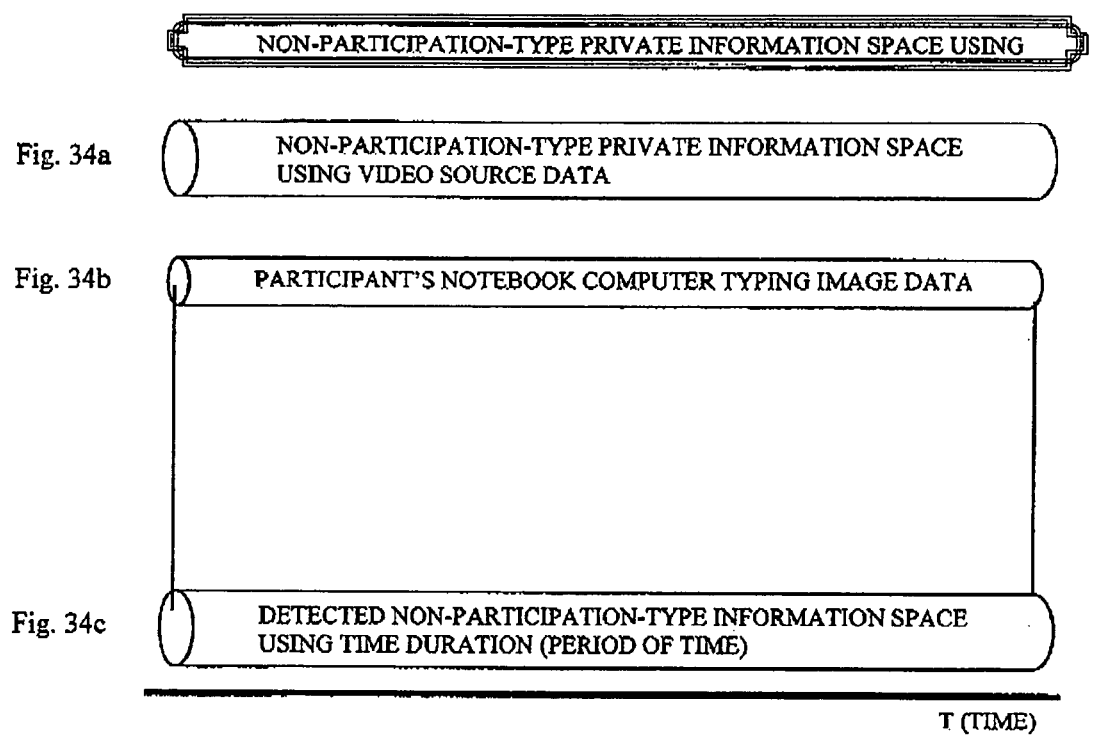
FIG. 34 is a time line chart of a functional action of "Non-Participation-Type Private Information Space Using"

Referring now to FIG. 34, a case of "Non-Participation-Type Private Information Space Using" will be described. FIG. 34 is a time line chart of a functional action of "Non-Participation-Type Private Information Space Using". The abscissa axis in FIG. 34 indicates time (elapsed time). This time line chart shows: (a) "non-participation-type private information space using video source data" and (b) "participant's notebook computer typing image data", which are regarded as data in the above described media layer. The time line chart also shows (c) "detected non-participation-type private information space using time duration (period of time) ", which is regarded as data in the functional action layer.

The "non-participation-type private information space using video source data" in FIG. 34 are the motion image data of the non-participation-type private information space using action, and serve as the data source for the "participant's notebook computer typing image data". The partial conference video extracting unit 4 extracts the "participant's notebook computer typing image data" from the "non-participant-type private information space using video source data" by a conventional gesture recognition technique. The index providing unit 5 determines the time duration of the "Non-Participation-Type Private Information Space Using" in the functional action layer by calculating the logical sum of the time durations of the actions in the media layer, as in the case of "Speaking" shown in FIG. 14.

In a case where Alice performs "Non-Participation-Type Private Information Space Using" as a participant in the conference, the above described (a) "non-participation-type private information space using video source data" and (b) "Alice's notebook computer typing image data" are regarded as the data in the media layer relating to Alice. Also, the above described (c) "detected non-participation-type private information space using time duration (period of time)" is regarded as the data in the functional action layer relating to Alice.

Figure 35:
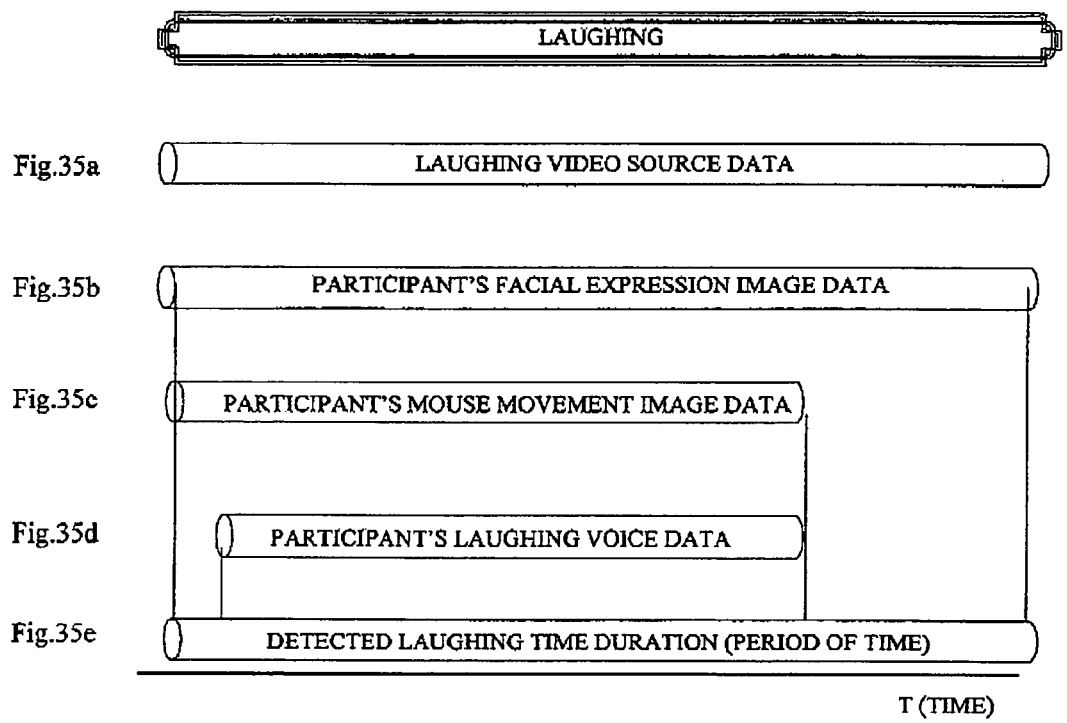
FIG. 35 is a time line chart of a functional action of "Laughing".

Referring now to FIG. 35, a case of "Laughing" will be described. FIG. 35 is a time line chart of a functional action of "Laughing". The abscissa axis in FIG. 35 indicates time (elapsed time). This time line chart shows: (a) "laughing video source data", (b) "participant's facial expression image data", (c) "participant's mouse movement image data", and (d) "participant's laughing voice data", which are regarded as data in the above described media layer. The time line chart also shows (e) "detected laughing time duration (period of time)", which is regarded as data in the functional action layer.

The "laughing video source data" in FIG. 35 are the motion image data of the laughing action, and serve as the data source for the "participant's facial expression image data" and the "participant's mouse movement image data". The partial conference video extracting unit 4 extracts the "participant's facial expression image data" from the "laughing video source data" by a conventional gesture recognition technique. Likewise, the partial conference video extracting unit 4 extracts the "participant's mouse movement image data" from the "laughing video source data". The index providing unit 5 determines the time duration of the "Laughing" in the functional action layer by calculating the logical sum of the time durations of the actions in the media layer, as in the case of "Speaking" shown in FIG. 14.

In a case where Alice laughs as a participant in the conference, the above described (a) "laughing video source data", (b) "Alice's laughing facial expression image data", (c) "Alice's mouse movement image data", and (d) "Alice's laughing voice data" are regarded as the data in the media layer relating to Alice. Also, the above described (e) "detected laughing time duration (period of time)" is regarded as the data in the functional action layer relating to Alice.

As described so far, in accordance with the second embodiment, index data corresponding to the functional actions of participants can be automatically generated from the index providing unit 5 for the partial conference video data extracted by the partial conference video extracting unit 4.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2004-083268 filed on Mar. 22, 2004 including specification, claims, drawings, and abstract is incorporated herein by reference in its entirety.

What is claimed is:

1. A conference information processing apparatus comprising:

an extracting unit which extracts partial conference audio and/or visual information from conference audio and/or visual information, the partial conference audio and/or visual information comprising at least one of audio data and video data of one or more physical actions performed by a conference participant in the conference audio and/or visual information, and which extracts at least one of audio and visual information of each physical action from the partial audio and/or visual information; and a providing unit which generates an index relating the partial conference audio and/or visual data to the physical actions, the index comprising:

information relating the one or more physical actions with a time duration over which the one or more physical actions occur;

information relating one or more physical actions with one or more functional actions, each functional action abstracted from one more physical actions; and information relating the partial conference audio and/or visual information with one or more functional actions, the partial conference audio and/or visual information abstracted from one or more functional actions; and a display unit which displays a summary of the conference audio and/or visual information, the summary comprising:

the one or more physical actions based on the time duration over which the one or more physical actions occur;

the one or more functional actions hierarchically arranged from the one or more physical actions; and the partial conference audio and/or visual data hierarchically arranged from one or more functional actions.

2. The conference information processing apparatus as claimed in claim 1, further comprising a producing unit that produces a summarized conference video of the conference audio and/or visual information in accordance with the index provided by the providing unit.

3. The conference information processing apparatus as claimed in claim 2, further comprising a recording unit that records the conference video summarized by the producing unit.

4. The conference information processing apparatus as claimed in claim 2, further comprising a display unit that displays the conference video summarized by the producing unit.

5. The conference information processing apparatus as claimed in claim 1, further comprising a synchronization unit that synchronizes conference videos with each other, the conference videos being captured in the same period of time.

6. The conference information processing apparatus as claimed in claim 1, further comprising a graphical user interface that displays the index provided by the providing unit.

7. The conference information processing apparatus as claimed in claim 1, wherein the providing unit calculates the time duration of the functional action from the logical sum of the time durations of the one or more physical actions.

8. The conference information processing apparatus as claimed in claim 1, wherein the providing unit identifies the functional action by at least a gesture made by the conference participant, the gesture being contained in the partial conference audio and/or visual information.

9. The conference information processing apparatus as claimed in claim 1, wherein the providing unit identifies the functional action by at least movements of the mouse of the conference participant, the movements of the mouse being contained in the partial conference audio and/or visual information.

10. The conference information processing apparatus as claimed in claim 1, wherein the providing unit identifies the functional action by at least movements of the eyes of the conference participant, the movements of the eyes being contained in the partial conference audio and/or visual information.

11. The conference information processing apparatus as claimed in claim 1, wherein the providing unit identifies the functional action by at least movements of the head of the conference participant, the movements of the head being contained in the partial conference audio and/or visual information.

12. The conference information processing apparatus as claimed in claim 1, wherein the providing unit identifies the functional action by at least a writing action of the conference participant, the writing action being contained in the partial conference audio and/or visual information.

13. The conference information processing apparatus as claimed in claim 1, wherein the providing unit identifies the functional action by at least the action of the conference participant standing up from his/her seat, the action being contained in the partial conference audio and/or visual information.

14. The conference information processing apparatus as claimed in claim 1, wherein the providing unit identifies the functional action by at least the action of the conference participant typing on a predetermined input device, the action being contained in the partial conference audio and/or visual information.

15. The conference information processing apparatus as claimed in claim 1, wherein the providing unit identifies the functional action by at least a facial expression of the conference participant, the facial expression being contained in the partial conference audio and/or visual information.

16. The conference information processing apparatus as claimed in claim 1, wherein the providing unit identifies the functional action by at least voice data of the conference participant, the voice data being contained in the partial conference audio and/or visual information.

17. The conference information processing apparatus as claimed in claim 2, wherein the producing unit produces conference videos for reviewing, the conference videos including active functional actions that are speaking, questioning, speech-type public information space using, question-type public information space using, and non-speech-type public information space using, and a functional action of speech-type thinking.

18. The conference information processing apparatus as claimed in claim 2, wherein the producing unit produces conference videos for public viewing, the conference videos including functional actions that are speaking, questioning, speech-type thinking, and speech-type public information space using.

19. The conference information processing apparatus as claimed in claim 2, wherein the producing unit produces conference videos for executives, the conference videos including functional actions that are speaking, speech-type thinking, and speech-type public information space using.

20. The conference information processing apparatus as claimed in claim 6, wherein the graphical user interface hierarchically displays the physical events and the functional actions abstracted from the physical actions.

21. The conference information processing apparatus as claimed in claim 6, wherein the graphical user interface displays scenes hierarchically with respect to the functional actions, each of the scenes being abstracted from one or more of the functional actions.

22. The conference information processing apparatus as claimed in claim 6, wherein the graphical user interface represents the index in the form of a time line or a table.

23. The conference information processing apparatus as claimed in claim 6, wherein the graphical user interface represents the functional actions in colors.

24. The conference information processing apparatus as claimed in claim 6, wherein the graphical user interface emphatically displays a change of audio speakers, a change of physical speakers, or a change of audio and physical speakers, by putting a color or a shape or giving a moving picture to the graphical representation of each corresponding one of the functional actions.

25. The conference information processing apparatus as claimed in claim 6, wherein the graphical user interface displays the data as to index identifiers, indexing start times, indexing end times, functional action names, roles of the conference participants, intended directions of the actions.

26. The conference information processing apparatus as claimed in claim 2, wherein the producing unit produces each conference video by summarizing an image portion that does not exceed a predetermined time duration in the corresponding partial conference audio and/or visual information.

27. A conference information processing method, comprising:
    extracting partial conference audio and/or visual information from conference audio and/or visual information, the partial conference audio and/or visual information comprising at least one of audio data and video data of one or more physical actions performed by a conference participant in the conference audio and/or visual information;
    extracting at least one of audio and visual information of each physical action from the partial audio and/or visual information;
    generating an index relating the partial conference audio and/or visual data to the physical actions, the index comprising:
        information relating the one or more physical actions with a time duration over which the one or more physical actions occur;
        information relating one or more physical actions with one or more functional actions, each functional action abstracted from one or more physical actions; and
        information relating the partial conference audio and/or visual information with one or more functional actions, the partial conference audio and/or visual information abstracted from one or more functional actions; and
    displaying summary of the conference audio and/or visual information on a display, the summary comprising:
        the one or more physical actions based on the time duration over which the one or more physical actions occur;
        the one or more functional actions hierarchically arranged from the one or more of the physical actions; and
        the partial conference audio and/or visual data hierarchically arranged from one or more functional actions.

28. The conference information processing method as claimed in claim 27, further comprising:
    producing a summarized conference video of the conference audio and/or visual information in accordance with the index.

29. A storage medium readable by a computer, the storage medium storing a program of instructions executable by the computer to perform a conference information processing method comprising:

extracting partial conference audio and/or visual information from conference audio and/or visual information, the partial conference audio and/or visual information comprising at least one of audio data and video data of one or more physical actions performed by a conference participant in the conference audio and/or visual information;

extracting at least one of audio and visual information of each physical action from the partial audio and/or visual information;

generating an index relating the partial conference audio and/or visual data to the physical actions, the index comprising:

information relating the one or more physical actions with a time duration over which the one or more physical actions occur;

information relating one or more physical actions with one or more functional actions, each functional action abstracted from one or more physical actions; and information relating the partial conference audio and/or visual information with one or more functional actions, the partial conference audio and/or visual information abstracted from one or more functional actions; and displaying a summary of the conference audio and/or visual information on a display, the summary comprising:

the one or more physical actions based on the time duration over which the one or more physical actions occur;

the one or more functional actions hierarchically arranged from the one or more physical actions; and the partial conference audio and/or visual data hierarchically arranged from one or more functional actions.

30. The storage medium as claimed in claim 29, further causing the computer to execute instructions to produce a summarized conference video of the conference audio and/or visual information in accordance with the index provided.

31. The conference information processing apparatus as claimed in claim 1, wherein the index is generated manually by a user.

32. The conference information processing apparatus as claimed in claim 1, wherein the one or more physical actions in the summary of the conference comprise a media layer, wherein the one or more functional actions hierarchically arranged from the one or more physical actions in the summary of the conference comprise a functional action layer, the functional action layer hierarchically arranged in the summary at a level higher the media layer, and wherein the partial conference audio and/or visual data hierarchically arranged from one or more functional actions comprise a scene layer, the scene layer hierarchically arranged in the summary at a level higher than the functional action layer.

33. The conference information processing method as claimed in claim 27, wherein the one or more physical actions in the summary of the conference comprise a media layer, wherein the one or more functional actions hierarchically arranged from the one or more physical actions in the summary of the conference comprise a functional action layer, the functional action layer hierarchically arranged in the summary at a level higher the media layer, and wherein the partial conference audio and/or visual data hierarchically arranged from one or more functional actions comprise a scene layer, the scene layer hierarchically arranged in the summary at a level higher than the functional action layer.

34. The storage medium as claimed in claim 29, wherein the one or more physical actions in the summary of the conference comprise a media layer, wherein the one or more functional actions hierarchically arranged from the one or more physical actions in the summary of the conference comprise a functional action layer, the functional action layer hierarchically arranged at a level higher the media layer in the summary, and wherein the partial conference audio and/or visual data hierarchically arranged from one or more functional actions comprise a scene layer, the scene layer hierarchically arranged at a level higher than the functional action layer in the summary.

* * * * *